United States Patent
Walker, Jr. et al.

(10) Patent No.: US 7,264,872 B2
(45) Date of Patent: Sep. 4, 2007

(54) DURABLE HIGH INDEX NANOCOMPOSITES FOR AR COATINGS

(75) Inventors: Christopher B. Walker, Jr., St. Paul, MN (US); Brant U. Kolb, Afton, MN (US); Emily S. Goenner, Shoreview, MN (US); Vivian W. Jones, Woodbury, MN (US); Sharon Wang, St. Paul, MN (US); Joan M. Noyola, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 208 days.

(21) Appl. No.: 11/026,702

(22) Filed: Dec. 30, 2004

(65) Prior Publication Data

US 2006/0147674 A1  Jul. 6, 2006

(51) Int. Cl.
*B32B 5/16* (2006.01)
*C08K 3/18* (2006.01)

(52) U.S. Cl. ............... 428/328; 106/450; 428/702; 977/783; 977/834; 977/902

(58) Field of Classification Search ............ 428/328, 428/702; 106/1.22, 1.25, 450; 977/834, 977/783, 902
See application file for complete search history.

(56) References Cited

U.S. PATENT DOCUMENTS

| | | | |
|---|---|---|---|
| 4,396,476 A | 8/1983 | Roemer et al. | |
| 5,677,050 A | 10/1997 | Bilkadi et al. | |
| 6,005,137 A | 12/1999 | Moore et al. | |
| 6,194,481 B1 * | 2/2001 | Furman et al. | 522/77 |
| 6,261,700 B1 * | 7/2001 | Olson et al. | 428/522 |
| 6,277,485 B1 | 8/2001 | Invie et al. | |
| 6,376,590 B2 * | 4/2002 | Kolb et al. | 524/413 |
| 6,416,838 B1 | 7/2002 | Arney et al. | |
| 6,653,425 B1 | 11/2003 | Armstrong-Poston et al. | |
| 6,656,258 B2 | 12/2003 | Elsbernd et al. | |
| 6,656,990 B2 * | 12/2003 | Shustack et al. | 524/430 |

(Continued)

FOREIGN PATENT DOCUMENTS

EP  0339880  8/1993

(Continued)

OTHER PUBLICATIONS

Park, Jong Hyeok et al., White Emission From Polymer/Quantum Dot Ternary Nanocomposites by Incomplete Energy Transfer, NANOTECHNOLOGY, vol. 15, No. 9, Sep. 2004, pp. 1217-1220.

(Continued)

*Primary Examiner*—H. Thi Le
(74) *Attorney, Agent, or Firm*—Carolyn A. Fischer

(57) ABSTRACT

The present invention includes ultraviolet curable compositions preferably containing discrete, crystalline zirconia nanoparticles with reactive, or copolymerizable, surface modification, in a polymerizable monomer/oligomer resin mixture. It is believed that copolymerizable surface modification provides a functional group that enables the functionalized particle to co-polmerize with the reactive monomers, oligomers, and crosslinkers in the formulation. Relative to surface modification of the nanoparticles, acrylate functionality is preferred over methacrylate functionality. On the other hand, methacrylate functionality is preferred over non-reactive, or nonpolymerizable, functionality. As the nanocomposite cures, the resultant network is heavily crosslinked by selection of raw materials with substantial acrylate functionality.

32 Claims, 1 Drawing Sheet

U.S. PATENT DOCUMENTS

| | | |
|---|---|---|
| 6,660,388 B2 | 12/2003 | Liu et al. |
| 6,663,978 B1 | 12/2003 | Olson et al. |
| 6,677,028 B1 | 1/2004 | Lasch et al. |
| 6,680,125 B1 | 1/2004 | Sasaki |
| 6,706,403 B1 | 3/2004 | Olofson et al. |
| 6,716,891 B1 | 4/2004 | Meisenburg et al. |
| 6,750,270 B1 * | 6/2004 | Klostermann et al. ...... 523/200 |
| 6,760,157 B1 | 7/2004 | Allen et al. |
| 6,777,070 B1 | 8/2004 | Murata et al. |
| 6,778,753 B2 | 8/2004 | Blomquist |
| 6,788,463 B2 | 9/2004 | Merrill et al. |
| 6,800,378 B2 | 10/2004 | Hawa et al. |
| 6,818,680 B2 | 11/2004 | Shustack |
| 6,844,950 B2 * | 1/2005 | Ja Chisholm et al. ........ 522/77 |
| 7,074,463 B2 * | 7/2006 | Jones et al. .................. 428/1.1 |
| 2002/0001710 A1 | 1/2002 | Kang et al. |
| 2002/0123589 A1 | 9/2002 | Olson et al. |
| 2003/0105189 A1 | 6/2003 | Yashiro et al. |
| 2003/0224250 A1 | 12/2003 | Setthachayanon et al. |
| 2005/0136252 A1 | 6/2005 | Chisholm et al. |

FOREIGN PATENT DOCUMENTS

| | | |
|---|---|---|
| EP | 1014113 | 6/2000 |
| JP | 05215902 | 8/1993 |
| JP | 08034768 | 2/1996 |
| JP | 2002-293762 | 10/2002 |
| WO | WO 2006/007286 | 1/2006 |

OTHER PUBLICATIONS

Antec 2002, Annual Technical Conference May 5-9, 2002, Conference Proceedings, vol. II—Materials, *Society of Plastics Engineers*; Scratch and Abrasion Resistant UV-Topcoats for Plastics Using Colloidal Silica Acrylates-Impact of Size, Size Distribution and Silica Loading on Coating Properties.

* cited by examiner

DURABLE HIGH INDEX NANOCOMPOSITES FOR AR COATINGS

BACKGROUND OF THE INVENTION

The development of films or coatings as protective films for display devices such as a CRT screen is well documented in the art. These include antireflective coatings, hardcoats, optical coatings, and the like. Nevertheless, there continues to be a need for further improvement in the development of polymerizable high index materials for optical applications. Exemplary applications include antireflective coatings and hardcoat materials. Many polymerizable films have a refractive index of 1.5 or less. Because of the optical advantages, however, an increase of the refractive index to 1.6 or more would be a desirable improvement, in the development of the very thin coatings (about 85 nm) required for high optical layers for in anti-reflection applications. Furthermore, there is a need for durable, inexpensive, and yet high quality antireflective coatings that exhibit a relatively low reflectance, that is less than 1%.

Another concern is that after application to a useful substrate, many formulations that consist of a mixture of resins, monomers, oligomers, and photoinitiators dewet (or bead up) when the mixture solution is dried of solvent, prior to the UV curing step. As a result, there are portions of the substrate that are not covered with the requisite thickness of the high index layer and other portions that are thicker than desired.

SUMMARY OF THE INVENTION

The above-referenced concerns are resolved by the development of new ultraviolet curable compositions preferably containing discrete, crystalline zirconia nanoparticles with reactive, or copolymerizable, surface modification, in a polymerizable monomer/oligomer resin mixture. It is believed that copolymerizable surface modification provides a functional group that enables the functionalized particle to co-polmerize with the reactive monomers, oligomers, and crosslinkers in the formulation.

Relative to surface modifying nanoparticles, acrylate functionality is preferred over methacrylate functionality. On the other hand, methacrylate functionality is preferred over non-reactive, or nonpolymerizable, functionality. As the nanocomposite cures, the resultant network is heavily crosslinked by selection of raw materials with substantial acrylate functionality.

Mixtures of nanoparticles of different sizes have been found to be advantageous to the invention. In particular, mixtures containing a majority of nanoparticles ranging in size from 10-30 nm along with a minority of nanoparticles ranging in size from about 80-150 nm, result in highly transparent and durable compositions.

DETAILED DESCRIPTION

Figure 1:
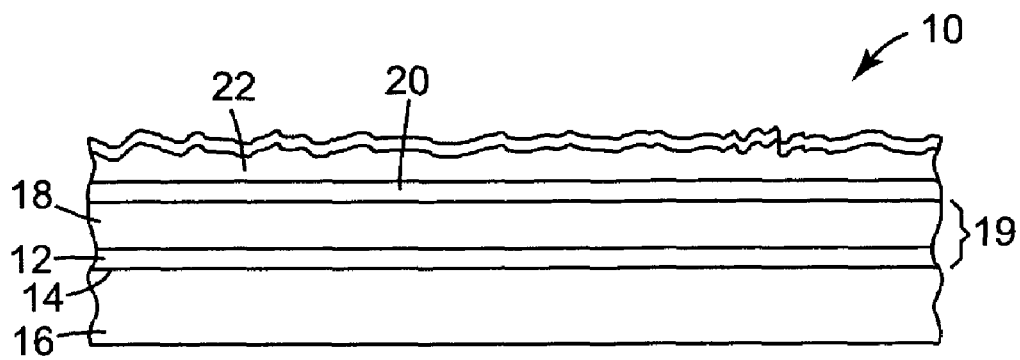
FIG. 1 illustrates a coating construction containing an optical coating, in accordance with the present invention.
Figure 2:
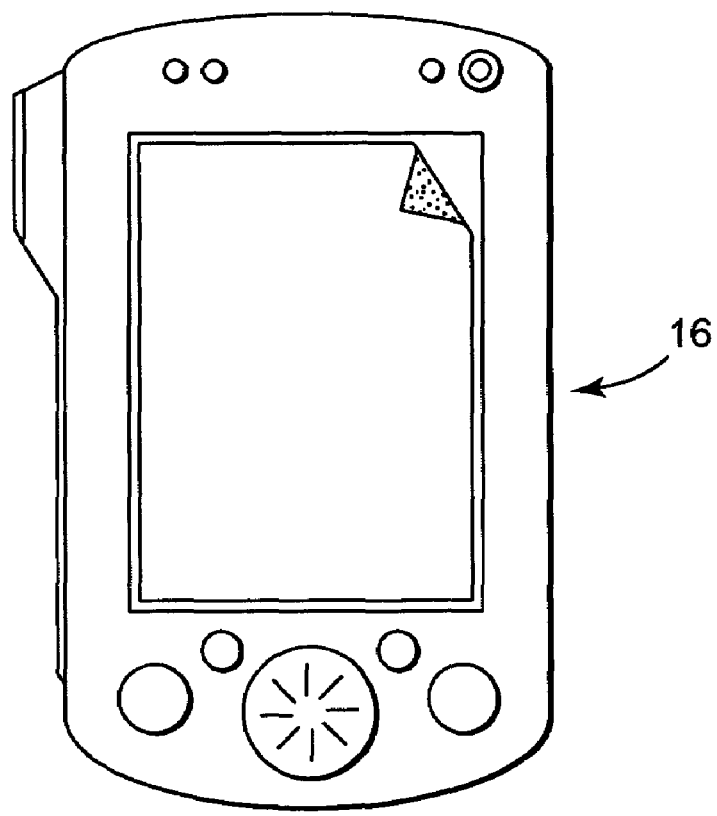
FIG. 2 illustrates a typical display device in accordance with the present invention.

The present invention includes a composition containing a polymerizable monomer/oligomer resin mixture. The resin mixture is provided at about 30 to 70 wt % of the total composition. Resins with multifunctionality are preferred. Acrylate functionality is preferred over methacrylate functionality. Methacrylate functionality is preferred over non-reactive functionality. Resins of the present invention may be selected from the group including resins having mono acrylate, diacrylate, triacrylates, and multifunctional (>3) acrylates such as tetraacrylate, and pentaacrylate functionality. Other resins may be selected from the group including resins possessing aromatic and halogen functionality (bromine being particularly preferred) to raise the refractive index. Particular resins of the present invention include pentaerythritol tri and tetraacrylate mixture, dipentaerythritol pentaacrylate, diacrylate of epoxidized bisphenol A, diacrylate of epoxidized brominated bisphenol A, and phenoxyethyl acrylate.

Useful crosslinking agents include, for example, poly (meth)acryl monomers selected from the group consisting of (a) di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate; (b) tri(meth)acryl containing compounds such as glycerol triacrylate, trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate, tris(2-hydroxyethyl)isocyanurate triacrylate; (c) higher functionality (meth)acryl containing compounds such as ditrimethylolpropane tetraacrylate, dipentaerythritol pentaacrylate, ethoxylated (4) pentaerythritol tetraacrylate, pentaerythritol tetraacrylate, caprolactone modified dipentaerythritol hexaacrylate; (d) oligomeric (meth)acryl compounds such as, for example, urethane acrylates, polyester acrylates, epoxy acrylates; polyacrylamide analogues of the foregoing; and combinations thereof. Such compounds are widely available from vendors such as, for example, Sartomer Company, Exton, Pa.; UCB Chemicals Corporation, Smyrna, Ga.; and Aldrich Chemical Company, Milwaukee, Wis. Additional useful (meth)acrylate materials include hydantoin moiety-containing poly(meth)acrylates, for example, as described in U.S. Pat. No. 4,262,072 (Wendling et al.).

A preferred crosslinking agent comprises at least three (meth)acrylate functional groups. Preferred commercially available crosslinking agents include those available from Sartomer Company, Exton, Pa. such as trimethylolpropane triacrylate (TMPTA) available under the trade designation "SR351", pentaerythritol tri/tetraacrylate (PETA) available under the trade designation "SR444" or "SR295" and pentaerythritol pentaacrylate available under the trade designation "SR399". Further, mixtures of multifunctional and lower functional acrylates, such as a mixture of PETA and phenoxyethyl acrylate (PEA), available under the trade designation "SR399", may also be utilized.

Surface modified colloidal nanoparticles are present in the polymerized structure in an amount effective to enhance the abrasion resistance and/or refractive index of the coating. The surface modified colloidal nanoparticles described herein may have a variety of desirable attributes, including for example: nanoparticle compatibility with resin systems such that the nanoparticles form stable dispersions within the resin systems; surface modification to provide reactivity of the nanoparticle with the resin system thereby making the composite more abrasion resistant; and surface modified nanoparticles added to resin systems thereby providing a low impact on the stability of the uncured composition viscosity. A combination of surface modifications can be used to manipulate the uncured and cured properties of the composition. Appropriately surface modified nanoparticles can improve optical and physical properties of the composition such as, for example, improved resin mechanical strength, minimized viscosity changes while increasing solid volume loading in the resin system and maintaining optical clarity while increasing solid volume loading in the resin system.

The surface modified colloidal nanoparticles can be oxide particles having a particle size or associated particle size of greater than 1 nm and less than 200 nm. Their measurements can be based on transmission electron miscroscopy (TEM). The nanoparticles can include metal oxides such as, for example, alumina, tin oxides, antimony oxides, silica, zirconia, titania, mixtures thereof, or mixed oxides thereof. Surface modified colloidal nanoparticles can be substantially fully condensed.

Silica nanoparticles may have a particle size from 5 to 150. Silica nanoparticles may be present in the durable article or optical element in an amount from 10 to 60 wt %, or 10 to 40 wt %. Silicas for use in the materials of the invention are commercially available from Nalco Chemical Co. (Naperville, Ill.) under the product designation NALCO COLLOIDAL SILICAS. For example, silicas include NALCO products 1040, 1042, 1050, 1060, 2327 and 2329.

Zirconia nanoparticles will typically exhibit a particle size from 5-150 nm, or 5 to 75 nm, or 5 to 25 nm, or 5-15 nm. Zirconia nanoparticles can be present in the coating in an amount from 10 to 70 wt %, or 30 to 50 wt %. Zirconias for use in materials of the invention are commercially available from Nalco Chemical Co. (Naperville, Ill.) under the product designation NALCO OOSSOO8, Buhler (Uzweil, Switzerland) under the product designation WO or WOS. 3M Company produces zirconia internally as described in copending Patent Application Publication No. 2006-0148950-A1, herein incorporated by reference.

Titania, antimony oxides, alumina, tin oxides, and/or mixed metal oxide nanoparticles can have a particle size or associated particle size from 5 to 50 nm, or 5 to 15 nm, or 10 nm. Titania, antimony oxides, alumina, tin oxides, and/or mixed metal oxide nanoparticles are anticipated to be useful in the durable article or optical element in an amount from 10 to 70 wt %, or 30 to 50 wt %. Mixed metal oxide for use in materials of the invention are commercially available from Catalysts & Chemical Industries Corp., (Kawasaki, Japan) under the product designation Optolake 3.

U.S. Pat. No. 6,800,378, herein incorporated by reference, further describes other inorganic oxide particles useful as nanoparticles, and, aqueous, organic, and mixed sols that may be employed when surface modifying the nanoparticles of the present invention. Mixed oxides containing more than one type of inorganic atom are also employed as described in U.S. Patent Application No. US2003 0165680, herein incorporated by reference. Accordingly, in some embodiments, Ti/Sb mixed oxide nanoparticles may be combined with additional nanoparticles having a different elemental composition (e.g., silica, zirconia, alumina, titania, antimony pentoxide). Desirably, such additional nanoparticles, if present, have an average particle size comparable to that of the Ti/Sb mixed oxide nanoparticles. Such nanoparticles may be commercially obtained, for example, from Nalco Chemical Co. (Naperville, Ill.) or Nyacol Nano Technologies, Inc. (Ashland, Mass.). Exemplary additional nanoparticles are also described in U.S. Pat. Nos. 5,037,579; and 6,261,700; which disclosures are incorporated herein by reference.

Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of its surface with a surface treatment agent so that the stabilized particle can copolymerize or react with the polymerizable resin during curing.

The nanoparticles of the present invention are preferably treated with a surface treatment agent. In general a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other siliceous fillers. Silanes and carboxylic acids are preferred for metal oxides such as zirconia. The surface modification can be done either subsequent to mixing with the monomers or after mixing. When silanes are employed, reaction of the silanes with the particle or nanoparticle surface is preferred prior to incorporation into the resin. The required amount of surface modifier is dependant upon several factors such as particle size, particle type, modifier molecular weight, and modifier type. In general, it is preferred that about a monolayer of modifier be attached to the surface of the particle. The attachment procedure or reaction conditions required also depend on the surface modifier used. When employing silanes, surface treatment at elevated temperatures under acidic or basic conditions for about 1-24 hours is preferred. Surface treatment agents such as carboxylic acids do not usually require elevated temperatures or extended time.

Representative embodiments of surface treatment agents suitable for the durable compositions include compounds such as, for example, isooctyl trimethoxy-silane, N-(3-triethoxysilylpropyl) methoxyethoxyethoxyethyl carbamate (PEG3TES), Silquest A1230, N-(3-triethoxysilylpropyl) methoxyethoxyethoxyethyl carbamate (PEG2TES), 3-(methacryloyloxy)propyltrimethoxysilane, 3-(Acryloxypropyl)trimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate, 2-(2-methoxyethoxy)acetic acid, methoxyphenyl acetic acid, and mixtures thereof.

The surface modification of the particles in the colloidal dispersion can be accomplished in a variety of ways. The process involves the mixture of an inorganic dispersion with surface modifying agents. Optionally, a co-solvent can be added at this point, such as for example, 1-methoxy-2-propanol, ethanol, isopropanol, ethylene glycol, N,N-dimethylacetamide and 1-methyl-2-pyrrolidinone. The co-solvent can enhance the solubility of the surface modifying agents as well as the surface modified particles. The mixture comprising the inorganic sol and surface modifying agents is subsequently reacted at room or an elevated temperature, with or without mixing. In a preferred method, the mixture can be reacted at about 85 degree C. for about 24 hours, resulting in the surface modified sol. In a preferred method, where metal oxides are surface modified the surface treatment of the metal oxide can preferably involve the adsorption of acidic molecules to the particle surface. The surface modification of the metal oxide may take place at room temperature.

The surface modification of ZrO2 with silanes can be accomplished under acidic conditions or basic conditions. In one preferred case the silanes are preferably heated under acid conditions for a suitable period of time. At which time the dispersion is combined with aqueous ammonia (or other base). This method allows removal of the acid counter ion from the ZrO2 surface as well as reaction with the silane. In a preferred method the particles are precipitated from the dispersion and separated from the liquid phase and redispersed in a solvent.

The surface modified particles can then be incorporated into the curable resin in various methods. In a preferred aspect, a solvent exchange procedure is utilized whereby the resin is added to the surface modified sol, followed by removal of the water and co-solvent (if used) via evaporation, thus leaving the particles dispersed in the polymerizable resin. The evaporation step can be accomplished for example, via distillation, rotary evaporation or oven drying.

In another aspect, the surface modified particles can be extracted into a water immiscible solvent followed by solvent exchange, if so desired.

Alternatively, another method for incorporating the surface modified nanoparticles in the polymerizable resin involves the drying of the modified particles into a powder, followed by the addition of the resin material into which the particles are dispersed. The drying step in this method can be accomplished by conventional means suitable for the system, such as, for example, oven drying or spray drying.

A combination of surface modifying agents can be useful, wherein at least one of the agents has a functional group co-polymerizable with a hardenable resin. For example, the polymerizing group can be ethylenically unsaturated or a cyclic function subject to ring opening polymerization. An ethylenically unsaturated polymerizing group can be, for example, an acrylate or methacrylate, or vinyl group.

Compositions of the present invention may also be characterized as nanocomposites. Nanocomposites are defined as a polymer matrix that contains well-dispersed nanoparticles. Nanoparticles are defined as particles that are smaller than 200 nanometers and often smaller than 100 nm. U.S. Pat. No. 5,385,776 exemplifies the current understanding of nanocomposites incorporated within polyamides and is herein incorporated by reference. A nanoparticle is generally an inorganic particle such as a metal, metal oxide, metal nitride, metal carbide or metal chloride. In accordance with the present invention, the use of high index nanoparticles increases the refractive index of compositions incorporating the same. Preferred nanoparticles include crystalline zirconia, although other high index nanoparticles such as zirconia, silica, titania, antimony, mixtures of metal oxides, mixed metal oxides, and mixtures thereof are acceptable. Crystalline zirconia is preferred over amorphous zirconia due to the greater refractive index of compositions containing crystalline zirconia. The zirconia may optionally contain yttrium in an amount of about 0.1 to 8.0% with regard to the total amount of oxide. Functionalized silica nanoparticles may be added to the zirconia based compositions for added reinforcement and abrasion resistance of the finished coating. Example of useful silica particles are those available from Nalco Chemical Company of Naperville, Ill. Examples of useful zirconia are those described in U.S. Pat. No. 6,376,590, and examples of titania are described in U.S. Pat. No. 6,432,526, both incorporated by reference in their entirety. Zirconia particles may be supplied by NALCO, 3M Company, and BUHLER. Zirconia is typically employed at about 30-70 wt %, with the combination of high refractive index and durability observed when provided at about 50-70 wt %. With lower amounts of zirconia in this preferred range (50-70 wt %) greater durability was observed as determined by laboratory analysis. Accordingly, 50 wt % of zirconia is most preferred. Silica nanoparticles may be provided at about 0 to 20 wt % with 10 wt % preferred. All weight percents are given relative to the total compositional weight. In the invention, resins are present in 30-70 wt % and nanoparticles are present in 30-70 wt %. The neat formulation method only permits formulation with at most 50 wt % particles, whereas the dilute mixing method permits formulating with unlimited % particles. Therefore, for examples where >50 wt % nanoparticles are employed, the dilute mixing method was utilized.

In further accordance with the present invention, a relatively small percentage of relatively larger particles, but still less than one micron in size, may be included in the present compositions. Because the percentage is low, the use of larger particles of relatively high or low index is included.

The present invention may be distinguished from matte particles. The use of matte coatings as optical films is well known in the display industry. A matte appearance provides enhanced viewing for the reader by lowering glare through the use of relatively larger particles, 1-10 micrometers, that provide "scattered reflection". This sort of product can be prepared without any AR function at all. However, the antiglare (AG) character provided by these larger particles may be added to an antireflection (AR) construction by incorporation of the large (1-10 micron) particles either in the hardcoat layer or in the high index layer as described by Fuji, U.S. Pat. No. 6,693,746, herein incorporated by reference.

Surface modification of the nanoparticles relates to the reaction of specific molecules on the surface of particles, and is useful in achieving good dispersion or solubility within the polymer matrix, improved coating transparency, and improved coating durability. Accordingly, the nanoparticles are preferably treated with surface modifying agents such as carboxylic acids, silanes and/or dispersants to help compatibilize them with the polymer matrix. U.S. Pat. No. 6,329,058 exemplifies typical surface modifiers and is herein incorporated by reference. In essence, it is believed that surface modification prevents particle agglomeration thereby facilitating particle dispersion within the monomers and resins, and therefore enhancing the transparency of the coating formulation. Furthermore, the mixtures of the present invention contain high index nanoparticles thereby resulting in films or coatings less likely to dewet when dried out of solvent, thus enabling the formation of very thin but uniform coatings that may then by UV cured to form uniform high refractive index layers. Surface modification is also necessary for transparency and assist in easy particle dispersion in the monomers, solvents, and resins. Surface modifier molecules exhibit a functionality that can covalently bond or adsorb to the particle surface. For example, carboxylic acid or silane functionality can covalently bond or adsorb to particle surface and examples of these modifiers include methoxyethoxyethoxyacetic acid (MEEAA) and Siquest A-1230™. The use of surface modifiers with high refractive index is also preferred and includes naphthyl acetic acid and trimethoxy phenyl silane.

The nanoparticles of the present invention may also be surface modified by reactive or copolymerizable surface modifiers. Reactive surface modification means that surface modifiers are employed that include functional groups that facilitate polymerization in addition to functionality that can either adsorb or covalently bond with the particle surface. When a coating of the present invention is polymerized (or cured), it forms a nanocomposite having particles covalently linked to the polymer matrix thus enhancing the durability of the cured coating. Examples of such modifiers are acrylic acid, methacrylic acid, and silanes with a radical polymerizable group, such as the trimethoxysilylpropylmethacrylate, preferred acrylate silane, and silica. When employing mixtures of nanoparticles, a combination of benefits may be realized. For example, surface modified zirconia may be added to raise the refractive index, while surface modified silica may be added to further enhance durability.

Compositions of the present invention may further contain any of the well known Type I and Type II UV photoinitiators, such as the substituted acetophenones, benzoins, phosphine oxides, benzophenone/amine combinations, and other photoinitiator classes well known to those in the art. Exemplary photoinitiators include Irgacure™819, Darocure™ 1173, or TPO supplied for example by Ciba Specialty Chemicals of Tarrytown, N.Y., and TPO-L supplied for example by BASF. It is believed that radical photoinitiators cleave in the presence of ultraviolet light to form radicals that initiate the polymerization of the acrylate and methacrylate functional groups in the formulation to form the crosslinked nanocomposite. Known types and classes of radical photoinitiators may be employed as described in, "Chemistry and Technology of UV & EB Formulation For Coatings, Inks, & Paints" of Volume 3 of Photoinitiators for Free Radical Cationic Polymerization, published by SITA Technology Ltd., Gardiner House, Broomhill Road, LONDON SW18184JQ ENGLAND, herein incorporated by reference.

Specific photoinitiators which are useful in the compositions of the invention include onium salts as described in U.S. Pat. No. 5,545,676, herein incorporated by reference. Onium salts have been found to be useful as coinitiators in high speed visible light curing of free radically polymerizable systems. Photoinitiators are typically employed from about 0.05 wt % to about 10 wt %, and more preferably at about 1 to 4 wt %.

The refractive index of the composite is a function of the $ZrO_2$ loading and the index of the resin. Refractive indices can be calculated employing known densities, refractive indices of the particles or resins, and weight ratios using a volume average method. For example for a two component system weight percents are converted to volume percentages and the net refractive index is the sum of (volume fraction 1 times index 1)+(volume fraction 2 times index 2).

The durability is a function of the particle loading, particle size, particle size distribution, the surface treatment, film surface roughness, the resin system crosslinking, and the surface treatment reactivity with the curing resin matrix. It has been shown that surface modification using materials that react into the matrix give much better durability than nonreactive surface treatments. A preferred surface treatment agent is 3-(acryloxypropyl)trimethoxy silane.

The compositions need to provide a high refractive index layer that is very thin (less about 110 nm) and are desirably durable. It is also preferred that they can be processed by fluid coating techniques and hardened rapidly at temperatures low enough to not destroy polymer films substrates such as PET. Compositions have been found that meet these requirements. The compositions have been effectively solvent coated and cured on polymeric films. Reproducible coating thickness of below 100 nm have been obtained.

It has been found that surface roughness on a very small scale gives an increase in durability without effecting the optical quality. This roughness may be obtained by incorporating a small amount of larger particles into the composition. This can be accomplished, for instance, by using $ZrO_2$ with a broad particle size distribution or deliberate introduction of a small fraction of larger particles. The surface roughness may also develop due to certain drying or curing conditions. The surface topography can be measured by Atomic Force Microscopy (AFM). AFM measurements show various amounts of roughness for different compositions. The AFM reveals "peaks" that rise up out of the surface as much as 120 nm high in some samples. These peaks may serve to keep the source of abrasion away from the cured surface. The surface of the UV cured films of the invention have been studied by AFM (atomic force microscopy). The "10 pt mean" is the mean value of the highest 10 points observed in a 10 um by 10 um square on the surface of the film. The films with the higher 10 pt mean values have a rougher surface and performed better (with the preferred nanoparticle surface modification) in the cheesecloth abrasion test.

The instrument used for this analysis was a Digital Instruments Dimension 5000 SPM. The probes used were Olympus OTESPA single crystal silicon levers with a force constant of ~40N/M. The mode of operation was tapping-mode™, the scan size was 10 micrometers on a side (10×10 micrometer imaged area), the scan speed was 1.02 Hz, the imaging setpoint ratio was 75% of the original amplitude signal in space ($A_0$) ($A_{sp}/A_0$=1.5/2/0). The data was planefit to correct for sample tilt. The Rz (10 point mean) was measured on the 10 micrometer datasets (where Rz is the average of the ten greatest peak-to-valley separations on the sample;

$$\frac{1}{n}[(H_1 + H_2 \ldots H_n) - (L_1 + L_2 + \ldots L_n)].$$

where Hn are the ten highest points in the dataset and Ln are the ten lowest points.

Ten micron by ten micron squares were measured with the AFM and the mean value of the 10 highest peaks was then recorded. The rougher films all employ bigger particles, in the form of the broader distribution zirconia (zirconia sol 1 and zirconia sol 2) or the bimodal distribution containing primarily smaller zirconia and larger silica, in the dimensions and weight percents characterized herein. With regard to the "10 point peak mean", at least 30 nm is desired for preferred durability or suitable roughness, but no greater than 1000 nm. It has been found that roughness is not the only factor that contributes to good performance or optimum durability. The particulates are preferably treated with acrylate silanes rather than methacrylate silanes, although both may be employed in the present invention. Furthermore, it has been found that compositions containing 70 wt % or more zirconia (or total inorganic particles) exhibit a relative reduced durability.

Coatings made in accordance with the present invention exhibit a 10 point mean roughness value of at least 30 nanometers and as high as 120 nanometers, as examined using Atomic Force Microscopy on a typical 10×10 micrometer area. Preferably, the roughness is 60-120 nm.

One method for obtaining the rough surface is incorporation of a minority of larger particles into the formulation. This can be done by using a nanoparticle with a broader particle size distribution. Alternatively a rough surface may be obtained by deliberately adding a minority of larger sized particles into a formulation with smaller particles.

Particle size and particle size distribution were determined by Photon Correlation Spectroscopy (PCS). The volume-average particle size was determined by Photon Correlation Spectroscopy (PCS) using a Malvern Series 4700 particle size analyzer (available from Malvern Instruments Inc., Southborough, Mass.). Dilute zirconia sol samples were filtered through a 0.2 µm filter using syringe-applied pressure into a glass cuvette that was then covered. Prior to starting data acquisition the temperature of the sample chamber was allowed to equilibrate at 25° C. The supplied software was used to do a CONTIN analysis with an angle of 90 degrees. CONTIN is a widely used mathematical method for analyzing general inverse transformation problems that is further described in S. W. Provencher, Comput. Phys. Commun., 27, 229 (1982). The analysis was performed using 24 data bins. The following values were used in the calculations: refractive index of water equal to 1.333, viscosity of water equal to 0.890 centipoise, and refractive index of the zirconia particles equal to 1.9.

Two particle size measurements were calculated based on the PCS data. The intensity-average particle size, reported in nanometers, was equal to the size of a particle corresponding to the mean value of the scattered light intensity distribution. The scattered light intensity was proportional to the sixth power of the particle diameter. The volume-average particle size, also reported in nanometers, was derived from a volume distribution that was calculated from the scattered light intensity distribution taking into account both the refractive index of the zirconia particles and the refractive index of the dispersing medium (i.e., water). The volume-average particle size was equal to the particle size corresponding to the mean of the volume distribution. The intensity-average particle size was divided by the volume-average particle size to provide a ratio that is indicative of the particle size distribution.

Relative to size distribution, it is believed that grinding zirconia particles produces a broad spectrum of relatively smaller particles with a reduced quantity of relatively larger particles dispersed therein.

The size and size distribution can be measured by photon correlation spectroscopy. The polydispersity term above is a measure of the distribution of different size particles. As polydispersity values become smaller, the closer the actual distribution is to the ideal case where all the particles are identical in size (i.e. they are monodisperse). In accordance with the present invention, it is desirable to have a distribution of relatively larger and smaller particles. Accordingly, a polydispersity value ranging from 0.4 to 0.8, and more preferably about 0.6 to 0.7, is desired to provide the protrusion of larger particles that is believed to lead to greater durability. The volume mean and Z average means are values the instrument predicts would match the light scattering data. In the analysis of the particle sizes, the Z average substantially emphasizes those particles that are on the high end of the distribution. Accordingly, a Z average mean ranging from about 20 to 80, and more preferably about 60 to 65, is desired. On the other hand, the volume mean typically measures about 3.5 to about 20. What is most important is that the compositions of the present invention contain larger particles mixed with smaller particles. The Intensity (I) mean is the calculated mean of particle size that deflects the light. As large particles are far more likely to encounter the light than small ones, the intensity mean, like the Z average mean, emphasizes those particles that are very large. As shown in the table relative to Malvern PCS Measurements, an intensity mean of about 25 to 150, and more preferably 90 to 105, reflects useful batches of nanoparticles with respect to larger particles. In this patent application, the large particles are believed to be those that protrude from the surface of the film. Accordingly, the exact quantity of very large particles is not assessed, and the presence of this population is described by the polydispersity, the Z average mean, the I average, and the ratio of the I average to the Volume average. The ratio of the I average to the Volume average typically ranges from about 1.5 to about 18, wherein a preferred value is about 14.28.

Bimodal Particle Distribution

In the mixtures of ZrO2 with silica (the bimodal distribution) the fraction of particles that is larger is equal to:

(wt % large particles)/(total wt % particles)

and ranges from about 10% (example 41) to 33.3% (example 51). Other relatively larger particles may include zirconia for example.

The majority of nanoparticles are sized to have a Volume mean average of 10-30 nanometers. "Majority" is defined to be over 50% by weight of the nanoparticles, and more preferably from about 67 to 90% by weight. A minority of nanoparticles are sized to have an average cross-sectional diameter of about 80-150 nanometers. "Minority" is defined to be less than 50% by weight of the nanoparticles, and more preferably from about 33 to 10% by weight. To illustrate, Example 51 has 40 wt % ZrO2 and 20 wt % silica with the weight percents relative to the total compositional weight. Therefore, the % of large particles as a % of all of the particles is 20/60 or about 33.3%. Accordingly, in yet a further aspect of the invention, a composition as described above and further containing a particle distribution as described immediately above is believed to give superior durability while retaining refractive indices greater than 1.60.

Other additives may included in the present compositions. For example, UV sensitizers, oxygen scavengers, and other components useful in free radical curing may be employed as known in the art.

The invention is further illustrated, but not thereby limited, by the Examples given below.

Raw Materials and Suppliers

The table given below lists the various tradenames mentioned herein, and the respective chemical and respective supplier for each tradename.

| Material | Chemical Name | Vendor or source |
|---|---|---|
| SR295 | Mixture of pentaerythritol tri and tetraacrylate | Sartomer |
| CN120Z | Acrylated bisphenol A | Sartomer |
| SR339 | Phenoxyethyl acrylate | Sartomer |
| MEEAA | Methoxyethoxyethoxyacetic acid | Sigma-Aldrich |
| ASi | 3-(acryloxypropyl)trimethoxysilane | Gelest |
| A1230 | Nonionic silane | OSI Specialties, a Crompton Corp. |
| AA | Acrylic Acid | Sigma-Aldrich |
| Dowanol$^{PM}$ | 1-Methoxy-2-Propanol | Sigma-Aldrich |
| A174 | (3-Methacryloxy)propyl-trimethoxysilane | OSI Specialties, a Crompton Corp. |
| Darocure 1173 | 2-Hydroxy-2-methyl-1-phenyl-2-propan-1-one | Ciba Specialty Chemicals |
| Irgacure 819 | | Ciba Specialty Chemicals |
| Lucirin TPO-L | | BASF |
| ZrO2 Sol 1 | Buhler ZrO2 Sol WO lot 1 | Buhler, Uzweil, Switzerland |
| ZrO2 Sol 2 | Buhler ZrO2 sol WO lot2 | Buhler, Uzweil, Switzerland |
| ZrO2 Sol 3 | Buhler ZrO2 Sol WOS | Buhler, Uzweil, Switzerland |
| ZrO2 Sol 4 | Nalco ZrO2 Sol 00SS008 | Nalco Chemical Company |
| ZrO2 Sol 5 | Several batches were used in this application all made similarly according to copending docket # 60346 US002 | 3M internal |
| Silica Sol 1 | Nalco SiO2 Sol (110 nm) XC3A0265AO | Nalco Chemical Company |
| Prostab 5198 | Inhibitor | Ciba Specialty Chemicals |
| RDX51027 | Diacrylate of brominated bisphenol A | Surface Specialties, Smyrna, GA. |

Particle Size Determination

The particle size and particle size distribution for ZrO2 Sol 1, sol 2, sol 3, and sol 5 were measured via photon correlation spectroscopy. Appropriate lots of nanoparticles were examined with a Malvern PCS Autosizer 4700 (from Malvern Instruments Ltd, Malvern, UK) with a laser wavelength of 488 nm, temperature 25.0 C, cell type ZET5110, and detector angle of 90 deg. For the ZrO2 dispersions, an appropriate amount was diluted in water, and measured with settings of Dispersant R.I. 1.33 and sample R.I. 1.90. The measurements were performed on 5 samples of each sol, each sample measurement was measured 20 times and the average values are reported for each sol.

For the analysis of the data by CUMULANTS analysis, a monomodal (or Gaussian) distribution is presumed. A Z average mean or (intensity mean size) is calculated (and is proportional to $d^6$ where d=particle diameter) and the polydispersity is a measure of the breadth of the distribution. Larger polydispersities imply bigger distributions and therefore some larger particles.

For the analysis of the data by CONTIN, which is a multimodal method, particles are not presumed to be monomodal, and values of Intensity average (I-ave) and volume average (V-ave) are calculated. As the Intensity average is proportional to $d^6$, whereas volume average is proportional to $d^3$, the Intensity average gives higher weight to larger particles. Therefore the larger the ratio of I-ave/V-ave, the bigger the distribution. The table below presents the analysis results from both the CUMULANTS and CONTIN analysis.

The particle size of SiO2 sol 1 were not measured. The manufacturer reports a size of 110 nm with a narrow size distribution

| | Malvern PCS Measurements | | | | | |
|---|---|---|---|---|---|---|
| | Dispersant RI = 1.33 | Sample RI = 1.90 | Intensity | Volume | Analysis | I ave/V |
| ZrO2 Sample | Z Ave Mean (nm) | Polydispersity | Mean (nm) | Mean (nm) | mode | ave |
| ZrO2 sol 3 | 35.7 | 0.442 | 57.4 | 13.3 | Contin | 4.31 |
| ZrO2 sol 2 | 54.0 | 0.645 | 118.0 | 8.5 | Contin | 13.8 |
| ZrO2 sol 1 | 70.5 | 0.655 | 144.3 | 10.1 | Contin | 14.28 |
| ZrO2 sol5 | 27.4 | 0.223 | 34.4 | 17.3 | Contin | 1.98 |

Data for ZrO2 sol 5 is representative data from one of the batches used.

EXAMPLE 1

General Approach to Formulation Preparation:

Neat Preparation: One or more commercially available resins with various levels of functionality such as mono acrylate, diacrylate, tetraacrylate, and pentaacrylate functionality, were mixed in amber jars. Some resins possessed aromatic and halogen functionality (bromine is especially preferred) to raise the refractive index. Surface modified nanoparticles (prepared separately) were added in the solvent, along with a photoinitiator, and then the solvent was removed by rotary evaporation. This process yields a neat, viscous mixture of particles in resins. This material can then be combined with coating solvents, photoinitiators, and other adjuvants.

Solution Mixing: Nanoparticles were surface modified and transferred into a solvent. Resins were mixed in a separate container with solvent. Resin solution and nanoparticles solutions are then mixed in desired proportions. The process is not encumbered by viscosity. Typical solvents include methyl ethyl ketone (MEK), acetone, toluene, and ethyl acetate. The loading of all solids within the solvent, including the particles, modifiers, resins, monomers, photoinitiators, is about 2 to 20 wt %, with the solvent comprising the remainder of the weight. With the solution mixing approach, nanoparticles may be added between 0-100% of the solids, and resins may be added between 0-100% of the solids, as there is no viscosity constraint. For the purposes of the overall invention, the useful loading of the nanoparticles is 30-70 wt % of the solids and the useful loading of the resins is 30-70 wt % of the solids.

EXAMPLE 2

Surface Modification of Zirconia Nanoparticles:

400.0 grams of ZrO2 Sol 4 and 26.57 grams of MEEAA were charged to a 1 L round bottom flask. The water and acetic acid were removed via rotary evaporation at 80° C. The powder thus obtained was redispersed in 398 grams of D.I. water. 416.56 grams of the particles dispersed in water was charged to a 2 L beaker. While stirring the particle dispersion, 800 grams of 1-methoxy-2-propanol, 45.0 grams of Silane A-174™, and 29.21 grams of Silquest A-1230™ were slowly added to the beaker. This mixture was then poured into two quart-sized jars, sealed and heated to 90° C. for three hours. The contents of the jars were removed and concentrated via rotary evaporation to 40.43 wt % zirconia. 1268.0 grams of deionized water and 42.0 grams concentrated aqueous ammonia (29% ammonia) were charged to a 4 L beaker.

The concentrated dispersion was added slowly to the beaker while stirring. The white precipitate thus obtained was isolated via vacuum filtration and washed with additional deionized water. The damp solids were dispersed in methylethylketone (MEK). The resultant silane modified zirconia dispersion contained 14.89% zirconia and was employed in making the formulations described in Examples 29, 30, and 34.

EXAMPLE 3

Preparation of Silane-modified Zirconia Nanoparticle Dispersion: 456.02 grams of ZrO2 Sol 4 and 41.62 grams of MEEAA were charged to a one liter round bottom flask. The water and acetic acid were removed via rotary evaporation. The powder thus obtained was redispersed in 285 grams of deionized water and charged to a two liter beaker to which was added while stirring 625 grams 1-methoxy-2-propanol, 63.12 grams of trimethoxysilylpropylmethacrylate, and 42.38 grams of Silquest™A-1230. This mixture was stirred thirty minutes at room temperature then poured into 1 L (quart) jars, sealed and heated to 90° C. for 4.5 hours. The contents of the jars were removed and concentrated via rotary evaporation. 1850 grams of deionized water and 61.3 grams of concentrated aqueous ammonia (29% ammonia) were charged to a 4 L beaker. The concentrated dispersion was added slowly to the beaker with stirring. The white precipitate thus obtained was isolated via vacuum filtration and washed with additional deionized water. The damp solids were dispersed in 540 grams of 1-methoxy-2-propanol. The resultant silane modified zirconia dispersion contained 15.58% zirconia.

A 1 L round bottom flask (large neck) was charged with 429.6 grams of the above-modified sol, 81.8 grams of a 48%/35%/17% blend of pentaerythritol tri and tetraacrylate mixture/diacrylate of bisphenol A/phenoxyethyl acrylate, and a 2% solution of a radical scavenger or stabilizer such as Prostab 5198 in 1.6 grams of water. The radical scavenger is added to scavenge any prematurely formed radicals that if not quenched, would begin a slow polymerization shortening the shelf life of the formulation. Water and alcohol were removed via rotary evaporation. A mostly clear low viscosity liquid was obtained The solution contained 38.52% zirconia as measured by TGA (thermogravimetric analysis). The refractive index was 1.567. 0.93 grams of Darocure™ 1173 was added to 151 grams of the zirconia-containing resin. After dissolving in solvent this material was employed in Example 25.

Preparation of silane-modified zirconia nanoparticle dispersion: ZrO2 Sol 4 (450.8 g) and 40.6 g MEEAA were charged to a 1 liter round bottom flask. The water and acetic acid were removed via rotary evaporation. The powder thus obtained was redispersed in (299) g D.I water. The dispersion was 28 wt % ZrO2. The aqueous ZrO2 sol (497.25 g) was charged to a jar to which was added, with stirring, 628.54 g 1-methoxy-2-propanol, 62.18 g A174, 41.80 g Silquest A-1230. This mixture was stirred 30 min at room temperature then poured into 1 L (quart) jars, sealed and heated to 90° C. for 3 hours. The contents of the jars were removed and concentrated to 31.12% ZrO2 via rotary evaporation. Deionized water (1850 g) and 61.4 g concentrated aqueous ammonia (29% NH3) were charged to a 4 L beaker. The concentrated dispersion was added slowly to the beaker with stirring. The white precipitate thus obtained was isolated via vacuum filtration and washed with additional D.I. water. The damp solids were dispersed in 540 g 1-methoxy-2-propanol. The resultant silane modified zirconia dispersion contained 19.86 wt % solids.

A 1 liter round-bottom flask (large neck) was charged with the above modified sol (305.35 g), a 48/35/17 blend of SR295/CN120/SR339 (14.2 g) and a 5% solution of Prostab 5198 in water (0.11 g). Water and alcohol were removed via rotary evaporation. A high viscosity dispersion was obtained. The solution contained approximately 58 wt % ZrO2. After dissolving in solvent and adding photoinitiator, this material was employed as the coating in example 13.

EXAMPLE 4

Preparation of Silane-modified Zirconia Nanoparticle Dispersion:

400.0 grams of ZrO2 Sol 4 and 26.57 grams of MEEAA were charged to a one liter round bottom flask. The water and acetic acid were removed via rotary evaporation. The powder thus obtained was redispersed in 302.82 grams of deionized water and charged to a two liter beaker to which was added while stirring 800 grams 1-methoxy-2-propanol, 41.19 grams of (trimethoxysilyl)propyl acrylate, 29.34 grams of Silquest™A-1230 and 0.5 grams of a 2% solution of Prostab™5198 in water. This mixture was stirred thirty minutes at room temperature then poured into 1 L (quart) jars, sealed and heated to 90° C. for 3.0 hours. The contents of the jars were removed and concentrated via rotary evaporation. 1242 grams of deionized water and 42 grams of concentrated aqueous ammonia (29% ammonia) were charged to a 4 L beaker. The concentrated dispersion was added slowly to the beaker with stirring. The white precipitate thus obtained was isolated via vacuum filtration and washed with additional deionized water. The damp solids were dispersed in acetone. The resultant silane modified zirconia dispersion contained 16.2% zirconia. Zirconia dispersions were all filtered to less than one micron. This material was formulated by the dilute solution method to make example 33.

Preparation of silane-modified zirconia nanoparticle dispersion: ZrO2 Sol 4 (555.3 g) and (32.49 g) MEEAA were charged to a 1 liter round bottom flask. The water and acetic acid were removed via rotary evaporation. The powder thus obtained was redispersed in 567.87 g D.I water. The dispersion was 15.19 wt % ZrO2. The aqueous ZrO2 sol (729.93 g) was charged to a jar to which was added, with stirring, 800 g 1-methoxy-2-propanol, 49.50 g A174, 33.26 g Silquest A-1230 and 0.4 g a 5 wt % Prostab 5198 solution in water. This mixture was stirred 30 min at room temperature then poured into 1 L (quart) jars, sealed and heated to 90° C. for 3 hours. The contents of the jars were removed and concentrated to 41.51% ZrO2 via rotary evaporation. Deionized water (1510.95 g) and 49.86 g concentrated aqueous ammonia (29% NH3) were charged to a 4 L beaker. The concentrated dispersion was added slowly to the beaker with stirring. The white precipitate thus obtained was isolated via vacuum filtration and washed with additional D.I. water. The damp solids were dispersed in isopropanol. The resultant silane modified zirconia dispersion contained 27.45 wt % solids. This material was employed in formulating examples 14, 15, 20-24, 26-28.

Silane Modified Zirconia Dispersion 136.33 g ZrO2 Sol 5 (132316:105) (10.7% ZrO2) was charged to ajar to which was added, with stirring, 200 g 1-methoxy-2-propanol, 2.98 g A174, 2.01 g Silquest A-1230 and a 5% solution of Prostab 5198 in water (0.02 g). This mixture was stirred 30 min at room temperature then poured into a 1 L jar, sealed and heated to 90° C. for 3.5 hours. The contents of the jars were removed and concentrated to approximately 57% ZrO2 via rotary evaporation. Deionized water (200 g) and 6.72 g concentrated aqueous ammonia (29% NH3) were charged to a 1 L beaker. The concentrated ZrO2 dispersion was added slowly to the beaker with stirring. The white precipitate thus obtained was isolated via vacuum filtration and washed with additional D.I. water. The damp solids were dispersed in 46.84 g isopropanol. The resultant silane modified zirconia dispersion contained 19.55 wt % solids. This material was employed in formulating examples 18 and 19.

MEEAA Modified ZrO2 sol 4 Dispersion

ZrO2 Sol 4 (200 g) and 19.93 g MEEAA were charged to a 1 liter round bottom flask and was concentrated via rotary evaporation. Isopropanol (200 g) was then added to the concentrated sol. The dispersion was then concentrated again via rotary evaporation. Another 200 g isopropanol was added to the sol and it was concentrated again. The final concentrated sol was 25.33% ZrO2. This material was employed in formulating examples 11 and 12.

MEEAA/AA Modified ZrO2 Sol 4 Dispersion

ZrO2 Sol 4 (200 g), 9.97 g MEEAA and 16 g acrylic acid were charged to a 1 liter round bottom flask and was concentrated via rotary evaporation. Isopropanol (200 g) was then added to the concentrated sol. The dispersion was then concentrated again via rotary evaporation. Another 200 g isopropanol was added to the sol and it was concentrated again. The final concentrated sol was 22.21% ZrO2. This material was employed in formulating examples 16 and 17.

ZrO2 Sol 5 ZrO2 75/25
3-(acryloxypropyl)trimethoxy silane/A1230

Dialysis: ZrO2 sol 5 (1,085 g 44.53 wt % solids) was charged to 5 dialysis bags (Spectra/Por Molecularporous Membrane tubing MWCO 12-14,000) and dialyzed in 8 lt of DI water. The water was replenished after 30 min and after 12 hr. The sol was isolated (1291.2 g 35.64% solids) and used for the silane treatment.

The dialyzed ZrO2 sol (320.19 g 35.63% solids, 32.25% ZrO2) was charged to a 1 qt jar. DI water (150 g) was charged with stirring. Methoxypropanol (443 g), 3-(acryloxypropyl) trimethoxy silane (26.92 g) and A1230 (18.23 g) were charged to a 1 lt beaker with stirring. The methoxypropanol mixture was then charged to the ZrO2 sol with stirring. The jar was sealed and heated to 90 C. for 4 hr 40 min. After heating the mixture was concentrated to 405 g via rotary evaporation. DI water (1290 g) and Concentrated NH3 (29.5 g, 29 wt %) were charged to a 4 lt beaker. The above concentrated sol was added to this with minimal stirring. A white precipitate was obtained. The precipiate was isolated as a damp filter cake via vacuum filtration. The damp solids (360 g) were dispersed in methoxypropanol (1400 g). The mixture was stirred for about 48 h. The mixture was then concentrated (265.29 g) via rotary evaporation. Methoxypropanol (248 g) was added and the mixture concentrated (273.29 g) via rotary evaporation. Methoxypropanol was charged (221 g) and the mixture was concentrated via rotary evaporation. The final product 282.29 g was isolated at 45.24% solids. The mixture was filtered thru a 1 micron filter. This material was used in examples 48-52.

ZrO2 Sol 3 75/25 3-(acryloxypropyl)trimethoxy silane/A1230

The ZrO2 sol 3 (400.7 g 23.03% ZrO2) was charged to a 1 qt jar. Methoxypropanol (400 g), 3-(acryloxypropyl) trimethoxy silane (18.82 g) and A1230 (12.66 g) were charged to a 1 lt beaker with stirring. The methoxypropanol mixture was then charged to the ZrO2 sol with stirring. The jar was sealed and heated to 90 C for 5.5 hr. After heating the mixture (759 g) was stripped to 230.7 g via rotary evaporation.

DI water (700 g) and Concentrated NH3 (17.15 g, 29 wt %) were charged to a 4 lt beaker. The above concentrated sol was added to this with minimal stirring. A white precipitate was obtained. The precipitate was isolated as a damp filter cake via vacuum filtration. The damp solids (215 g) were dispersed in methoxypropanol (853 g). The mixture was then concentrated (226 g) via rotary evaporation. Methoxypropanol (200 g) was added and the mixture concentrated (188.78 g) via rotary evaporation. Methoxypropanol was charged (195 g) and the mixture was concentrated (251.2 g) via rotary evaporation. Methoxypropanol (130 g) was charged and the mixture concentrated via rotary evaporation. The final product 244.28 was isolated at 39.9% solids. The mixture was filtered thru a 1 micron filter. This material was used in examples 44-47.

ZrO2 Sol 5 75/25 3-(acryloxypropyl)trimethoxy silane/A1230

The ZrO2 sol 5 (280.12 g, 40.05% solids, 36.02% ZrO2) was charged to a 1 qt jar. DI water (150 g) was charged with stirring. Methoxypropanol (456 g), 3-(acryloxypropyl) trimethoxy silane (26.26 g) and A1230 (17.75) were charged to a 1 lt beaker with stirring. The methoxypropanol mixture was then charged to the ZrO2 sol with stirring. The jar was sealed and heated to 90 C for 4 hr. After heating the mixture was stripped to 359.4 g via rotary evaporation. DI water (1287 g) and Concentrated NH3 (28.34, 29 wt %) were charged to a 4 lt beaker. The above concentrated sol was added to this with minimal stirring. A white precipitate was obtained. The precipitate was isolated as a damp filter cake via vacuum filtration. The damp solids (336 g) were dispersed in methoxypropanol (800 g). The mixture was then concentrated (296.9 g) via rotary evaporation. Methoxypropanol (200 g) was added and the mixture concentrated (280.7 g) via rotary evaporation. Methoxypropanol was charged (200 g) and the mixture was concentrated via rotary evaporation. The final product 258.6 g was isolated at 49.56% solids. The mixture was filtered with a 1 um filter. This material was used in example 40.

ZrO2 Sol 5 3-(methacryloxypropyl)))trimethoxysilane

Dialysis ZrO2 Sol 5 (207.4 g) was charged to a dialysis bag and dialyzed in 3500 g of DI water for 6 hr. (sigma diagnostics tubing MWCO>1200 was used. The sol was isolated (34.03% solids) and used for the silane treatment.

The dialyzed ZrO2 sol (80 g, 34.03% solids, 30.8% ZrO2) was charged to a 16 oz jar. DI water (80 g) was charged with stirring. Methoxypropanol (160 g), 3-(methacryloxypropyl) trimethoxy silane (8.59 g) were charged to a 500 ml beaker with stirring. The methoxypropanol mixture was then charged to the ZrO2 sol with stirring. The jar was sealed and heated to 90 C for 3 hr 15 min. After heating the mixture was stripped to 170 g via rotary evaporation a white sluury was obtained. DI water (258 g) and Concentrated NH3 (5.7 g, 29 wt %) were charged to a 1 lt beaker. The above concentrated sol was added to this with minimal stirring. The solids were isolated as a damp filter cake via vacuum filtration. The damp solids (82 g) were dispersed in methoxypropanol (200 g). The mixture was then concentrated (97 g) via rotary evaporation. Methoxypropanol (204 g) was added and the mixture concentrated (85.5 g) via rotary evaporation. Methoxypropanol was charged (205 g) and the mixture was concentrated via rotary evaporation. The final product 91.46 g was isolated at 27.4% solids. The mixture was filtered with a 1 um filter. This material was used in example 32.

(ZrO2 Sol 5 75/25 3-(acryloxypropyl)trimethoxy silane

The ZrO2 sol 5 (71.77 g, 42.14% solids, 37.92% ZrO2) was charged to a 16 oz jar. DI water (61.47 g) was charged with stirring. Methoxypropanol (135.2 g), 3-(acryloxypropyl) trimethoxy silane (7.87 g) and A1230 (5.3 g) were charged to a 500 ml beaker with stirring. The methoxypropanol mixture was then charged to the ZrO2 sol with stirring. The jar was sealed and heated to 90 C for 3 hr 30 min. After heating the mixture was stripped to 97 g via rotary evaporation a white slurry was obtained. DI water (386 g) and Concentrated NH3 (8.5 g, 29 wt %) were charged to a 1 lt beaker. The above concentrated sol was added to this with minimal stirring. The solids were isolated as a damp filter cake via vacuum filtration. The damp solids (85.7 g) were dispersed in methoxypropanol (~150 g). The mixture was then concentrated (110 g) via rotary evaporation. Methoxypropanol (100 g) was added and the mixture concentrated (106.8 g) via rotary evaporation. Methoxypropanol (100 g) was added and the mixture concentrated (109.46 g) via rotary evaporation. Methoxypropanol was charged (100 g) and the mixture was concentrated via rotary evaporation. The final product 91.02 g was isolated at 39.2% solids. The mixture was filtered with a 1 um filter. This material was used in example 41.

SiO2 Sol 1 75/25 3-(acryloxypropyl)trimethoxy silane/A1230

Silica sol 1 (XC3A0265AO, 110 nm) (327 g, 39.63% silica) was charged to a 1 qt jar. Methoxypropanol (351 g), 3-(Acryloxypropyl)trimethoxysilane (2.65 g), and A1230 (1.7 g) were charged to a 1 lt beaker. The mixture was then charged to the silica sol with stirring. The mixture was heated to 90 C for 16.5 hr. The mixture (299.53 g) was concentrated (153 g) via rotary evaporation. Methoxypropanol (194 g) was charged and the mixture concentrated (161.9 g) via rotary evaporation. Methoxypropanol (190 g) was charged and the mixture concentrated via rotary evaporation. The final product 157.5 g was isolated at 37.65% solids. This material was used in examples 41, 48-53.

ZrO2 Sol 1 75/25 3-(Acryloxypropyl)trimethoxysilane/A1230

The ZrO2 sol 1 (100.24 g 18.01% ZrO2) was charged to a 16 oz jar. Methoxypropanol (10 µg), 3-(acryloxypropyl) trimethoxy silane (3.65 g) and A1230 (2.47 g) were charged to a 500 ml beaker with stirring. The methoxypropanol mixture was then charged to the ZrO2 sol with stirring. The jar was sealed and heated to 90 C for 4 hr. After heating the mixture was stripped to 52 g via rotary evaporation.

DI water (175 g) and Concentrated NH3 (3.4 g, 29 wt %) were charged to a 500 ml beaker. The above concentrated sol was added to this with minimal stirring. A white precipitate was obtained. The precipitate was isolated as a damp filter cake via vacuum filtration. The damp solids (43 g) were dispersed in acetone (57 g). MgSO4 was added to the mixture and allowed to stand for about 30 min. The mixture was then filtered with fluted filter paper follow by 1 micron filter. The final product was isolated at 15.8% solids. This material was used in examples 36 and 37.

ZrO2 Sol 1 75/25 (3-(methacryloxypropyl))trimethoxysilane/A1230

The ZrO2 sol 1 (100 g, 29.46% ZrO2) was charged to a 16 oz jar. Methoxypropanol (100 g), 3-(methacryloxypropyl) trimethoxy silane (6.14) and A1230 (4.26) were charged to a 500 ml beaker with stirring. The methoxypropanol mixture was then charged to the ZrO2 sol with stirring. The jar was sealed and heated to 90 C for 5 hr. After heating the mixture was stripped to 52 g via rotary evaporation. DI water (179 g) and Concentrated NH3 (5.5 g, 29 wt %) were charged to a 500 ml beaker. The above concentrated sol was added to this with minimal stirring. A white precipitate was obtained. The precipitate was isolated as a damp filter cake via vacuum filtration. The damp solids (83.5 g) were dispersed in acetone (66.5 g). Mg SO4 was added to the mixture and allowed to stand for about 20 minutes. The mixture was then filtered with fluted filter paper follow by 1 micron filter. The final product was isolated at 12.9% solids. This material was used in example 31 and 35.

ZrO2 Sol 5 75/25
(3-Acryloxypropyl)trimethoxysilane/A1230

The ZrO2 sol 5 (100 g, 21.47% ZrO2) was charged to a 16 oz jar. Methoxypropanol (100 g), 3-(acryloxypropyl) trimethoxy silane (5.59 g) and A1230 (3.75 g) were charged to a 500 ml beaker with stirring. The methoxypropanol mixture was then charged to the ZrO2 sol with stirring. The jar was sealed and heated to 90 C for 3 hr. After heating the mixture was stripped to 130.62 g via rotary evaporation. DI water (143 g) and Concentrated NH3 (4.5 g, 29 wt %) were charged to a 500 ml beaker. The above concentrated sol was added to this with minimal stirring. A white precipitate was obtained. The precipitate was isolated as a damp filter cake via vacuum filtration. The damp solids (65.65 g) were dispersed in acetone (79 g). MgSO4 was added to the mixture and allowed to stand. The mixture was then filtered with fluted filter paper follow by 1 micron filter. The final product was isolated at 16.9% solids. This material was used in example 38.

ZrO2 Sol 2 75/25
(3-Acryloxypropyl)trimethoxysilane/A1230

The ZrO2 sol 2 (300.2 g, 27.12% ZrO2) was charged to a 16 oz jar. Methoxypropanol (300.57 g), (3-Acryloxypropyl trimethoxy silane (16.55 g) and A1230 (11.22 g) were charged to a 500 ml beaker with stirring. The methoxypropanol mixture was then charged to the ZrO2 sol with stirring. The ZrO2 sol 2 (400.1 g, 27.12% ZrO2) was charged to a 16 oz jar. Methoxypropanol (401 g), (3-Acryloxypropyl trimethoxy silane (21.91 g) and A1230 (14.98 g) were charged to a 500 ml beaker with stirring. The methoxypropanol mixture was then charged to the ZrO2 sol with stirring. The jar was sealed and heated to 90 C for 4 hr. After heating the mixture from the two jars was combined and concentrated to 507.77 g via rotary evaporation. DI water (1400 g) and Concentrated NH3 (34 g, 29 wt %) were charged to a 2000 ml beaker. The above concentrated sol was added to this with minimal stirring. A white precipitate was obtained. The precipitate was isolated as a damp filter cake via vacuum filtration. The damp solids (515 g) were dispersed in acetone (300 g). This was stirred overnight MgSO4 (226 g) was added and the mixture allowed to stand for about 30 min while being cooled in an ice bath. The mixture was then filtered with fluted filter paper follow by 1 micron filter and acetone (175 g) was added. The final product was isolated at 25% solids. This material was used in examples 39, 42 and 43.

EXAMPLE 5

An Experimental Preparation of a Dilute Formulation 29.42 grams of a mixture of 5% Buhler Zirconia with 3:1 Acryloxylpropyltrimethoxysilane:A1230 in acetone was mixed with 20.09 grams of 5% SR399 in acetone, and 0.025 grams of Irgacure™819 and 0.48 grams of acetone. This dilute solution was employed as the coating in Example 37. The other dilute formulations from Tables 2-8 given below were prepared in similar fashion; that is, taking a surface modified nanoparticle sol in a solvent, adding additional monomers/resins, additional solvents, and photoinitiators to afford the compositions described in Tables 2-8.

EXAMPLE 6

Experimental on Coating Films:
The substrate was a polyester film which had been previously coated with a hardcoat The hardcoat contains functionalized silica particles and multifunctional acrylate monomers, monomers, and photoinitiators. In this case, the hardcoat was essentially formed as described in Example 3 of U.S. Pat. No. 6,299,799, the entire reference of which is herein incorporated by reference.

Brief experimental on coating process/line speed for the composition of Example 5; as measured by EIT POWER-PUCK™.
% Solids=5 wt % solids/95 wt % solvent
Line Speed=10 fpm, solvents dried-out on line
Bulb=D provided by Fusion Systems "D" bulb, which provides UV radiation.
Nitrogen inerting was employed
UV Energy and power were measured with a POWER-PUCK™ from EIT, Inc.
(Sterling, Va.), for the UVA, UVB, UVC, and UVV regions of the ultraviolet spectrum, and the following were recorded.

This information gives the energy (J/cm^2) and power (W/cm^2) that the coating solution experienced as it was being UV polymerized. All our examples are cured at the same speed, therefore these vaues apply throughout the application. Essentially this implies that whenever a coating of the invention is UV polymerized at this speed, with this type of light, these conditions (N2 inerting, ambient temperature) the coating should be reproducibly cured to give the durability results we report. It is understood that if greater UV power (more lamps or more powerful lamps) were employed, that faster line speeds could be employed.

TABLE 1a

|  | Speed | Bulb | A J/cm2 | B J/cm2 | C J/cm2 | V J/cm2 | A W/cm2 | B W/cm2 | C W/cm2 | V W/cm2 |
|---|---|---|---|---|---|---|---|---|---|---|
| HIRANO | 10 fpm | D | 2.139 | 0.617 | 0.06 | 0.994 | 3.968 | 1.086 | 0.102 | 1.778 |

EXAMPLE 7

Example 7 is identical to Example 6, except for the use of a Fusion H bulb, which has greater output of shorter wavelengths.

TABLE 1b

|  | Speed | Bulb | A J/cm2 | B J/cm2 | C J/cm2 | V J/cm2 | A W/cm2 | B W/cm2 | C W/cm2 | V W/cm2 |
|---|---|---|---|---|---|---|---|---|---|---|
| HIRANO | 10 fpm | H | 1.1862 | 0.973 | 0.127 | 0.685 | 2.04 | 1.585 | 0.21 | 1.16 | he tables given below illustrate sample formulations coated and cured, the photoinitiator employed, the refractive index of the liquid coating (or a calculated value), the cured refractive index value (in a few cases), the solvent and concentration employed, the UV source (Fusion H or D bulb), the UVVIS maximum of the sample on the hardcoat (the target is 550 nm as the reflection maximum for a ¼ wave, values lower than 550 imply thinner coating, values higher represent a thicker coating), and the abrasion resistance results to date.

The cured samples were evaluated for durability by mechanically rubbing the sample with a 6 mm "stylus" wrapped with 24 layers of cheesecloth with a 2.2 kg weight on to of the stylus (plus the weight of the stylus) and noting how many passes or "rubs" were performed without damage being observed and at how many passes or "rubs" damage was observed. The results are given in an X/Y format, where the number X indicates the number of passes where the sample remained unchanged visually from the abrasion. The number Y represents the point at which damage was observed. Unacceptable abrasion resistance is defined as failure below 25 rubs. Passing abrasion resistance is indicated by failure between 50-100 rubs. Very good abrasion resistance is indicated by failure above 200 rubs.

The refractive index of neat liquid formulations was measured on a Zeiss refractometer.

Refractive index measurements of cured films were performed by spin coating on a silica wafer and measuring by ellipsometry. For example, Example 5 solution was applied to a silica wafer using spin coating and then UV cured. The spin coating speed is 1000 RPM. The UV process conditions are 500 w, D bulb, $N_2$, 25 ft/min. and 2 passes. The refractive index is measured by using ellipsometer. Reflected ellipsometric data was collected at $\theta=55°, 65°, 75°, \lambda=350-1000$ nm. The refractive index n is the average of two measurements at 550 nm. $n_1=1.6227$, $n_2=1.615$. $n_{ave}=1.6189$ Refractive indices were calculated on the basis of a volume average of the RI of the individual components. Refractive indices are calculated employing known densities, refractive indices of the particles or resins, and weight ratios using a volume average method. Weight percents are converted to volume percentages and the net refractive index is the sum of (volume fraction 1 times index 1)+(volume fraction 2 times index 2) and so on. Refractive indices of liquids are measured with a Zeiss refractometer while refractive indices of cured, crosslinked solids are measured with the Metricon (described elsewhere in the text). It is well known in the art that during curing coatings shrink thereby increasing the refractive index.

UVVIS measurements were made on the Shimadzu spectrophotometer. First surface reflection measurements were obtained using an MPC 3100 spectrophotometer in accordance with standardized testing method, First Surface Total and CP Reflection Measurement Using the Shimadzu Spectrophotometer. The thickness of the single high index optical layer on the hardcoated PET can be calculated from the following relationship:

$$t = \lambda/4\eta$$

where:

t=thickness (nm)

$\lambda$=wavelength (nm)

$\eta$=refractive index

Ideally, the samples will reflect maximally at 550 nm. For the compositions of refractive index=1.62, a cured coating thickness of about 85 nm is appropriate to provide the wavelength of maximum reflection of 550 nm.

EXAMPLES 11-12

TABLE 2a

| Ex | wt % ZRO2 nano | SM | wt % SM | wt % R | Resins and Ratios | wt % P.I. on total solids |
|---|---|---|---|---|---|---|
| 11 | 30 ZrO2 sol 4 | MEEAA | 12.86 | 56.14 | 48% pentaerythritol tri and tetraacrylate mixture; 35% diacrylate of bisphenol A; 17% phenoxyethyl acrylate | 1% Dar 1173 |
| 12 | 38.5 ZrO2 sol 4 | MEEAA | 16.51 | 43.99 | 48% pentaerythritol tri and tetraacrylate mixture; 35% diacrylate of bisphenol A; 17% phenoxyethyl acrylate | 1% Dar 1173 |

TABLE 2b

| Ex | Calculated uncured RI | Neat (liq) RI | Solid % in solvent | UVVIS Max (nm) | UV lamp | Durability Testing 80 nm samples 2 kg/cheese cloth |
|---|---|---|---|---|---|---|
| 11 | 1.558 | | 4% in IPA | ~550 | H | scratches <25 rubs, <25 |
| 12 | 1.5749 | | 4% in IPA | ~550 | H | scratches <25 rubs, <25 |

As shown in tables 2a and 2b, examples 8-12 employ zirconia sol 4, surface modified with solely methoxy ethoxy-ethoxyacetic acid (MEEAA), in a matrix of tetra-, di-, and monofunctional acrylates. The UVVIS spectrum shows a maximum near 550 nm for each formulation, indicating that the coating is close to ideal for ¼ wavelength performance. The coating quality was high and the refractive index is fairly high, however, the surface treatment of the particles is not reactive and the coating durability is low. SM in tables 2a and 2b denotes a surface modifier.

TABLE 3a

| Ex | wt % ZRO2 nano | SM | wt % SM | wt % R | Resins and Ratios | wt % P.I. on total solids |
|---|---|---|---|---|---|---|
| 13 | 58 ZrO2 sol 4 | 3:1 A174:A1230 | 21.46 | 20.54 | 48% pentaerythritol tri and tetraacrylate mixture; 35% diacrylate of bisphenol A; 17% phenoxyethyl acrylate | 1.3% Dar 1173 |
| 14 | 50 ZrO2 sol 4 | 3:1 A174:A1230 | 18.493 | 31.507 | 48% pentaerythritol tri and tetraacrylate mixture; 35% diacrylate of bisphenol A; 17% phenoxyethyl acrylate | 1.0% Dar 1173 |
| 15 | 70 ZrO2 sol 4 | 3:1 A174:A1230 | 25.89 | 4.1096 | 48% pentaerythritol tri and tetraacrylate mixture; 35% diacrylate of bisphenol A; 17% phenoxyethyl acrylate | 1.0% Dar 1173 |
| 16 | 30 ZrO2 sol 4 | 1:1 AA:MEEAA | 8.96 | 60.04 | 48% pentaerythritol tri and tetraacrylate mixture; 35% diacrylate of bisphenol A; 17% phenoxyethyl acrylate | 1% Dar 1173 |
| 17 | 38.5 ZrO2 sol 4 | 1:1 AA:MEEAA | 11.49 | 49.01 | 48% pentaerythritol tri and tetraacrylate mixture; 35% diacrylate of bisphenol A; 17% phenoxyethyl acrylate | 1% Dar 1173 |

In Tables 3a and 3b, Examples 16 and 17 provided high optical quality, moderately high refractive coatings of the desired thickness. Example 16 was moderate in durability. High levels of zirconia modified with 3:1 A174 (methacrylate silane):A1230 (a nonionic silane) in the resin of Examples 13-15 provided high optical quality, very high index coatings, with lower durability.

TABLE 3b

| Ex | Calc RI | Cured RI | Solid % in Solvent | UVVIS Max (nm) | UV lamp | Durability Testing 80 nm samples 2 kg/cheese cloth |
|---|---|---|---|---|---|---|
| 13 | 1.617 | | 4% MEK | 430 | H | <50 total wipe off |
| 14 | 1.593 | 1.615 | 4% in IPA | 600 | H | <50 scratch between 50/100 total removal, <25 |
| 15 | 1.67 | | 4% in IPA | 624 | H | <25 heavy scratch |
| 16 | 1.5617 | | 4% in IPA | ~550 | H | scratches between 50/100, 25/50 |
| 17 | 1.5801 | | 4% in IPA | ~550 | H | scratches <25 rubs, <25 |

TABLE 4a

| Ex | wt % ZRO2 nano | SM | wt % SM | wt % R | Resins and Ratios | wt % P.I. on total solids |
|---|---|---|---|---|---|---|
| 18 | 38.5 ZrO2 sol 5 | 3:1 A174:A1230 | 8.4512 | 53.049 | 48% pentaerythritol tri and tetraacrylate mixture; 35% diacrylate of bisphenol A; 17% phenoxyethyl acrylate | 1.0% Dar 1173 |
| 19 | 50 ZrO2 sol 5 | 3:1 A174:A1230 | 10.976 | 39.024 | 48% pentaerythritol tri and tetraacrylate mixture; 35% diacrylate of bisphenol A; 17% phenoxyethyl acrylate | 1.0% Dar 1173 |
| 20 | 59.4 ZrO2 sol 4 | 3:1 A174:A1230 | 23.28 | 16.32 | 48% pentaerythritol tri and tetraacrylate mixture; 35% diacrylate of bisphenol A; 17% phenoxyethyl acrylate | 1.0% TPO-L |
| 21 | 58.5 ZrO2 sol 4 | 3:1 A174:A1230 | 22.93 | 16.07 | 48% pentaerythritol tri and tetraacrylate mixture; 35% diacrylate of bisphenol A; 17% phenoxyethyl acrylate | 2.5% TPO-L |

TABLE 4b

| Ex | Calc RI | Cured RI | Solid % in Solvent | UVVIS Max (nm) | UV lamp | Durability Testing 80 nm samples 2 kg/cheese cloth |
|---|---|---|---|---|---|---|
| 18 | 1.58 | 1.606 | 4% in IPA | 530 | H | between 50/100 scratches/haze, 25/50 |
| 19 | 1.601 | 1.635 | 4% in IPA | 570 | H | 50/100 total removal (catastrophic no scratching before total failure), <25 |
| 20 | 1.6371 | | 4% in IPA | 560 | D | total removal <50 rubs |
| 21 | 1.6371 | | 4% in IPA | 495 | D | Scratches <50 rubs |

In tables 4a and 4b, Examples 18 and 19, high levels of ZrO2 sol 5 with 3:1 A174 (methacrylate silane):A1230 (a nonionic silane) surface modification into resin also gave high optical quality, high refractive index coatings, but some with lower durability. Similarly, 50 wt % zirconia sol 4 modified with 3:1 A174 (methacrylate silane):A1230 (a nonionic silane) in the resin was lower in durability in Examples 20 and 21 when cured with a phosphine oxide type photoinitiator and a Fusion D bulb.

TABLE 5a

| Ex | wt % ZRO2 nano | SM | wt % SM | wt % R | Resins and Ratios | wt % P.I. on total solids |
|---|---|---|---|---|---|---|
| 22 | 30 ZrO2 sol 4 | 3:1 A174:A1230 | 11.096 | 58.904 | 48% pentaerythritol tri and tetraacrylate mixture; 35% diacrylate of bisphenol A; 17% phenoxyethyl acrylate | 1.0% Dar 1173 |
| 23 | 38.5 ZrO2 sol 4 | 3:1 A174:A1230 | 14.24 | 47.26 | 48% pentaerythritol tri and tetraacrylate mixture; 35% diacrylate of bisphenol A; 17% phenoxyethyl acrylate | 1.0% Dar 1173 |
| 24 | 40 ZrO2 sol 4 | 3:1 A174:A1230 | 14.795 | 45.205 | 48% pentaerythritol tri and tetraacrylate mixture; 35% diacrylate of bisphenol A; 17% phenoxyethyl acrylate | 1.0% Dar 1173 |
| 25 | 38.5 ZrO2 sol 4 | 3:1 A174:A1230 | 14.25 | 47.25 | 48% pentaerythritol tri and tetraacrylate mixture; 35% diacrylate of bisphenol A; 17% phenoxyethyl acrylate | 0.62 Dar 1173 |
| 26 | 38.12 ZrO2 sol 4 | 3:1 A174:A1230 | 14.94 | 45.95 | 48% pentaerythritol tri and tetraacrylate mixture; 35% diacrylate of bisphenol A; 17% phenoxyethyl acrylate | 1.0% TPO-L |
| 27 | 37.54 ZrO2 sol 4 | 3:1 A174:A1230 | 14.71 | 45.25 | 48% pentaerythritol tri and tetraacrylate mixture; 35% diacrylate of bisphenol A; 17% phenoxyethyl acrylate | 2.5% TPO-L |

TABLE 5a-continued

| Ex | wt % ZRO2 nano | SM | wt % SM | wt % R | Resins and Ratios | wt % P.I. on total solids |
|---|---|---|---|---|---|---|
| 28 | 38.12 ZrO2 sol 4 | 3:1 A174:A1230 | 14.94 | 45.95 | 48% pentaerythritol tri and tetraacrylate mixture; 35% diacrylate of bisphenol A; 17% phenoxyethyl acrylate | 1.0% Irgacure ™ 819 |

TABLE 5b

| Ex | Calc RI | Neat (liq) RI | Cured RI | Solid % in solvent | UVVIS Max (nm) | UV lamp | Durability Testing 80 nm samples 2 kg/cheese cloth |
|---|---|---|---|---|---|---|---|
| 22 | 1.552 | | 1.581 | 4% in IPA | 540 | H | 350/400 light scratches, 100/150 |
| 23 | 1.567 | | 1.594 | 4% in IPA | 475 | H | 250/300 light scratches, 50/100 |
| 24 | 1.57 | | 1.596 | 4% in IPA | 500 | H | 100/150 total removal (catastrophic no scratching before total failure), 50/100 |
| 25 | 1.567 | 1.566 | 1.596 | 4% in MEK | 520 | H | 150/200 light scratches, 200/250 |
| 26 | 1.5755 | | | 4% in IPA | 450 | D | scratches between 250/300 rubs |
| 27 | 1.5754 | | | 4% in IPA | 480 | H | scratches between 150/200 rubs |
| 28 | 1.5755 | | | 4% in IPA | 475 | D | scratches between 250/300 rubs |

In tables 5a and 5b, durable formulations are shown employing as much as 38.5% zirconia sol 4 modified with 3:1 A174 (methacrylate silane):A1230 (a nonionic silane) in resin in examples 22-28. While quite durable, these formulations possessed an index just reaching 1.60 when cured.

TABLE 6a

| Ex | wt % ZRO2 nano | SM | wt % SM | wt % R | Resins and Ratios | wt % P.I. on total solids |
|---|---|---|---|---|---|---|
| 29 | 50 ZRO2 SOL 4 | 3:1 A174:A1230 | 18.5 | 30.5 | Dipentaerythritol pentaacrylate | 1% Irgacure ™ 819 |
| 30 | 50 ZRO2 SOL 4 | 3:1 A174:A1230 | 18.5 | 31 | Dipentaerythritol pentaacrylate | 0.5% |
| 31 | 50 ZRO2 SOL 1 | 3:1 A174:A1230 | 9.03 | 39.97 | Dipentaerythritol pentaacrylate | 1% |
| 32 | 50 ZrO2 sol 5 | A174 | 8.82 | 40.18 | Dipentaerythritol pentaacrylate | 1% |

TABLE 6b

| Ex | Calc RI | Cured RI | Solid % in Solvent | UVVIS Max (nm) | UV lamp | Durability Testing 80 nm samples 2 kg/cheese cloth |
|---|---|---|---|---|---|---|
| 29 | 1.5982 | | 5% in MEK | 500 | D | <50, <100, <100, 100/200, <50, <50, <50 |
| 30 | 1.5982 | | 5% in MEK | 500 | D | <50, <50, <50, <25, <25 |
| 31 | 1.611 | | 10% In acetone | 550 | D | 25/50, 25/50, 50/100, 50/100, 25/50, <25 |
| 32 | 1.6086 | | 7.5% in Methoxypropanol | 0 | D | <25, <25, <25 |

In table six, the resin is changed to dipentaerythritol pentaacrylate, for all the examples. The zirconia sol 4 was modified with 3:1 A174 (methacrylate silane):A1230 (a nonionic silane) in examples 29 and 30. The zirconia sol 5 in example 32 was modified with all A174. The zirconia sol 1 was modified with 3:1 A174 (methacrylate silane):A1230 (a nonionic silane) in example 31. These examples provided very high index, of appropriate optical thickness with modest to fair durability.

TABLE 7a

| Ex | wt % ZRO2 nano | SM | wt % SM | wt % R | Resins and Ratios | Wt % P.I. on total solids |
|---|---|---|---|---|---|---|
| 33 | 38.12 ZrO2 sol 4 | 3:1 acrylated silane:A1230 | 13.19 | 47.7 | 48% pentaerythritol tri and tetraacrylate mixture; 35% diacrylate of bisphenol A; 17% phenoxyethyl acrylate | 1.0% Irgacure ™ 819 |
| 34 | 30 ZrO2 sol 4 | 3:1 A174:A1230 | 11.1 | 57.9 | 50:50 diacrylate of bisphenol A:pentaerythritol tri and tetraacrylate mixture | 1.0% Irgacure ™ 819 |
| 35 | 38.5 ZrO2 sol 1 | 3:1 A174:A1230 | 6.94 | 53.565 | 48% pentaerythritol tri and tetraacrylate mixture; 35% diacrylate of bisphenol A; 17% phenoxyethyl acrylate | 1.0% Irgacure ™ 819 |
| 36 | 38.5 ZrO2 sol 1 | 3:1 Acrylate:A1230 | 6.8 | 53.7 | 48% pentaerythritol ri and tetraacrylate mixture; 35% diacrylate of bisphenol A; 17% phenoxyethyl acrylate | 1.0% Irgacure ™ 819 |
| 37 | 50 ZrO2 sol 1 | 3:1 Acrylate:A1230 | 8.83 | 40.17 | Dipentaerythritol pentaacrylate | 1.0% Irgacure ™ 819 |
| 38 | 50 ZrO2 sol 5 | 3:1 Acrylate:A1230 | 8.82 | 40.17 | Dipentaerythritol pentaacrylate | 1.0% Irgacure ™ 819 |
| 39 | 50 ZrO2 sol 2 | 3:1 Acrylate:A1230 | 8.83 | 40.17 | Dipentaerythritol pentaacrylate | 1.0% Irgacure ™ 819 |
| 40 | 50 ZrO2 sol 5 | 3:1 Acrylate:A1230 | 8.83 | 40.17 | Dipentaerythritol pentaacrylate | 1.0% Irgacure ™ 819 |
| 41 | 50 ZrO2 sol 5 and 6 SiO2 sol 1 | 3:1 Acrylate:A1230 | 9.02 | 33.98 | Dipentaerythritol pentaacrylate | 1.0% Irgacure ™ 819 |
| 42 | 60 ZrO2 sol 2 | 3:1 Acrylate:A1230 | 10.81 | 28.19 | Dipentaerythritol pentaacrylate | 1.0% Irgacure ™ 819 |
| 43 | 70 ZrO2 sol 2 | 3:1 Acrylate:A1230 | 12.61 | 16.39 | Dipentaerythritol pentaacrylate | 1.0% Irgacure ™ 819 |

TABLE 7b

| Ex | Calc RI | Solid % in solvent | UVVIS Max (nm) | UV lamp | Durability Testing 80 nm samples 2 kg/cheese cloth |
|---|---|---|---|---|---|
| 33 | 1.5786 | 4% in acetone | 430 | | 250/300 <50 200 |
| 34 | 1.5811 | 5% MEK | 580 | D | 50/100 150/200 50 100 150 50 |
| 35 | 1.5849 | 5% in acetone | 525 | D | 25/50, 150/200, 25/50 |
| 36 | 1.5851 | 5% in acetone | 500 | D | 150/200, 150/200, 150/200 |
| 37 | 1.605 uncured and 1.619 cured | 5% in acetone | 500 | D | 300/350, 450/500, 450/500 |
| 38 | 1.611 | 10% in acetone | | D | 50/100, 100/150, 50/100, 25/50, 25/50, 50/100, 100/150, 100/150, 100/150, 50/100 |
| 39 | 1.611 | 10% in acetone | 560 | D | 200/250, 150/200, 100/150, 150/200, 250/300, 200/250 |
| 40 | 1.609 | 10% in Methoxypropanol | 501 | | 100/150 100/150 |
| 41 | 1.612 | 10% in Methoxypropanol | 567 | | 100/150, 50/100 |
| 42 | 1.652 | 6.76% solids in 89.4:10.6 Acetone:Dowanol | 0 | D | 50/100, 25/50, 100/150, 150/200, 100/150, 50/100, 300/400, 400/500 |
| 43 | 1.71 | 6.76% solids in 89.4:10.6 Acetone:Dowanol | 527 | D | <25, <25, <25 |

Table seven shows many very durable, very high index formulations. The use of 3:1 acrylate silane:A1230 as a surface modifier for zirconia sol 5 in examples 38 and 40 to generate a very high index formulation with good durability should be noted. Even higher durability with equivalent high index (1.62) is exemplified in Examples 37 and 39, employing the zirconia sols (1 and 2) with acrylate silane:A1230 surface modification.

Example 42, with 60 wt % zirconia sol 2 and functionalized with acrylate silane/A1230 is the highest index durable formulation developed, possessing an index of 1.65 and durability averaging 100 passes. At 70 wt % loading (Example 43) durability becomes lower. Below is a table describing additional formulations employing either mixtures of the ZrO2 sol 5 and Silica sol 1 or additional examples with ZrO2 sol 3.

TABLE 8a

| Ex | nano | Wt % nanos | SM | Wt % SM | Resins and Ratios |
|---|---|---|---|---|---|
| 44 | ZrO2 sol 3 | 50.0 | 3:1 Acrylate Silane:A1230 | 9 | 48:35:17 SR295:CN120Z:SR339 |
| 45 | ZrO2 sol 3 | 50 | 3:1 Acrylate Silane:A1230 | 9 | SR399 |
| 46 | ZrO2 sol 3 | 50.0 | 3:1 Acrylate Silane:A1230 | 9 | 48:35:17 SR295:CN120Z:SR339 |
| 47 | ZrO2 sol 3 | 50.0 | 3:1 Acrylate Silane:A1230 | 9 | 48:35:17 SR295:CN120Z:SR339 |
| 48 | ZrO2 sol 5 SiO2 sol 1 | 50 ZrO2 5 SiO2 | 3:1 Acrylate Silane:A1230 | 9 | 48:35:17 SR295:CN120Z:SR339 |
| 49 | ZrO2 sol 5 SiO2 sol 1 | 50 ZrO2 10 SiO2 | 3:1 Acrylate Silane:A1230 | 9.17 | 48:35:17 SR295:CN120Z:SR339 |
| 50 | ZrO2 sol 5 SiO2 sol 1 | 40 ZrO2 10 SiO2 | 3:1 Acrylate Silane:A1230 | 7.4 | 48:35:17 SR295:CN120Z:SR339 |
| 51 | ZrO2 sol 5 SiO2 sol 1 | 40 ZrO2 20 SiO2 | 3:1 Acrylate Silane:A1230 | 7.74 | 48:35:17 SR295:CN120Z:SR339 |
| 52 | ZrO2 sol 5 SiO2 sol 1 | 50 ZrO2 10 SiO2 | 3:1 Acrylate Silane:A1230 | 9.17 | SR399 |
| 53 | ZrO2 sol 5 SiO2 sol 1 | 50 ZrO2 15 SiO2 | 3:1 Acrylate Silane:A1230 | 9.32 | SR399 |

TABLE 8b

| Ex | Wt % R | Wt % P.I on Total Solids | Calc RI | Solid % in Solvent |
|---|---|---|---|---|
| 44 | 40.00 | 1% 819 | 1.622 | 7.5% in 10:1 Acetone:Methoxy Propanol |
| 45 | 40.00 | 1% 819 | 1.6048 | 10% in 10:1 Acetone:Methoxy Propanol |
| 46 | 40.00 | 1% 819 | 1.622 | 7.5% in 10:1 Acetone:Methoxy Propanol |
| 47 | 40.00 | 1% 819 | 1.622 | 7.5% in 10:1 Acetone:Methoxy Propanol |
| 48 | 35.00 | 1% 819 | 1.6238 | 7.5% in 90:10 MEK:Dowanol |
| 49 | 29.83 | 1% 819 | 1.6254 | 7.5% in 90:10 MEK:Dowanol |
| 50 | 41.60 | 1% 819 | 1.5912 | 7.5% in 90:10 MEK:Dowanol |
| 51 | 31.26 | 1% 819 | 1.5916 | 7.5% in 90:10 MEK:Dowanol |
| 52 | 29.83 | 1% 819 | 1.6114 | 7.5% in 90:10 MEK:Dowanol |
| 53 | 24.68 | 1% 819 | | 7.5% in 90:10 MEK:Dowanol |

TABLE 8c

| Ex | nano | UV-VIS max nm | UV lamp | Durability Testing 80 nm samples 2 kg/cheesecloth |
|---|---|---|---|---|
| 44 | ZrO2 sol 3 | 580 | D | 25/50 25/50 100/150 50/100 50/100 50/100 |
| 45 | ZrO2 sol 3 | 520–540 | D | 100/200 300/400 100/150 150/200 200/250 300/400 |
| 46 | ZrO2 sol 3 | | D | 50/100 50/100 100/150 |
| 47 | ZrO2 sol 3 | | D | 100/150 100/150 100/150 50/100 |
| 48 | ZrO2 sol 5 SiO2 sol 1 | 598 | D | 50/100 50/100 50/100 |
| 49 | ZrO2 sol 5 SiO2 sol 1 | 517 | D | 150/200 150/200 50/100 |
| 50 | ZrO2 sol 5 SiO2 sol 1 | 584 | D | 400/500 |
| 51 | ZrO2 sol 5 SiO2 sol 1 | 573 565 | D | 200/250 200/250 200/250 |
| 52 | ZrO2 sol 5 SiO2 sol 1 | 581 | D | 150/200 300/350 400/500 |
| 53 | P-35 ZrO2 SiO2 sol 1 | 512 | D | 400/500 |

Use of Acrylate Silane

Comparison of Examples 37 and 39 vs. Example 31, where the selection of surface modifier is the only difference, strongly supports the advantage of acrylate silane functionality over methacrylate silane, where the acrylate silane is 3-(Acryloxypropyl)trimethoxysilane from Gelest. A similar improvement is observed when comparing Example 36 vs. Example 35. Example 32 was surface functionalized with all A174, whereas Examples 38 and 40 were 3:1 acrylate silane:A1230, but the superiority of Examples 38 and 40 is unquestionable in view of the durability testing in particular. As shown in Table 8c, the bimodal approach to thin coatings has been exemplified therein especially with regard to the durability when employing 10-20 wt % of the larger particles.

Methacrylate silane treated particles are well known to provide abrasion resistant coatings. One example is the 3M hardcoat described in the examples as the hardcoat on the PET. Other examples are the moderately high index (<1.60) formulations exemplified in Examples 22-28 of Tables 5a and 5b. Nevertheless, at the higher zirconia loadings necessary for very high index (>1.60) coatings, high durability has only been achieved with particle functionalization with acrylate silane in thin (<100 nm) coatings.

Broad Particle Size Distribution

The samples of zirconia sols (lots 1 and 2) were employed in the examples 31, 35, 36, 37, 39, 42, and 43. ZrO2 sol lot 3 was employed in examples 44-47. For reasons that are not understood, the protrusion of larger particles is greater when the resin is the SR399 resin in contrast to the 48:35:17 SR295:CN120Z:SR339 resins system. It is reasonable from the particle size measurement above that the zirconia sols lots 1 and 2 would give protrusion, given their diameter compared to the coated thickness target of 85 nm, but it is surprising that the zirconia sol lot 3 does (although to a lesser degree).

Measured Topography

It is believed that the very high durability of a 50 wt % zirconia (sols 1 and 2) cured formulation as given in Examples 37 and 39 may be a consequence of surface topography. This is supported by atomic force microscopy (AFM). In contrast to the relatively flat surface found in the formulations employing the small nanoparticles (such as given in Example 38, the AFM reveals "peaks" that rise up out of the surface as much as 120 nm high, as exemplified in Examples 37 and 39. These peaks may serve to keep the source of abrasion away from the cured surface. It is believed that the source of these peaks is larger particles present in the zirconia sols 1 and 2.

The respective surface of each of the UV cured films of the invention has been studied by AFM (atomic force microscopy). The "10 pt mean" is the mean value of the highest 10 points observed in a 10 um by 10 um square on the surface of the film. The films with the higher 10 pt mean values are obviously rougher and performed better (with the preferred surface modification) in the cheesecloth abrasion test.

particles in conjunction with a low % of low dispersity large particles (110 nm) performs well.

Films made in accordance with the present invention may be layered, laminated, or otherwise coupled to other films or display devices in accordance with the present invention. U.S. Pat. No. 6,800,378, herein incorporated by reference, describes a process of bonding layers of film together and also of bonding the antireflective film, for example, upon a display device. The same process may be employed in accordance with the present invention. Known techniques of preparing multilayer films may be employed to include spin coating, knife coating, and the like.

In yet another aspect of the invention, the optical films described above are included within an antireflective film construction. As shown in FIG. 1, an antireflective coating

TABLE 9

| ZrO2 sol | % ZrO2 | Resin | patent example # | 10 pt peak mean (nm) | Surface modific. | Durability test results |
|---|---|---|---|---|---|---|
| 3 | 50 | A | 44 | 23.8 | A | 25/50 25/50 100/150 50/100 50/100 50/100 |
| 3 | 50 | B | 45 | 40.2 | A | 100/200 300/400 100/150 150/200 200/250 300/400 |
| 3 | 50 | A | 46 | 12.8 | A | 50/100 50/100 100/150 |
| 2 | 50 | B | 39 | 64.9 | A | 200/250, 150/200, 100/150, 150/200, 250/300, 200/250 |
| 1 | 50 | B | 31 | 61.5 | M | 25/50, 25/50, 50/100, 50/100, 25/50, <25 |
| 5 | 50 | B | 38 | 25.2 | A | 50/100, 100/150, 50/100, 25/50, 25/50, 50/100, 100/150, 100/150, 100/150, 50/100 |
| 1 | 38.5 | A | 35 | 92 | M | 25/50, 150/200, 25/50 |
| 1 | 38.5 | A | 36 | 123 | A | 150/200, 150/200, 150/200 |
| 1 | 50 | B | 37 | 121 | A | 300/350, 450/500, 450/500 |
| 5 | 50 | B | 40 | 9 | A | 100/150 100/150 |
| 5* | 50* | B | 41 | 56 | A | 100/150, 50/100 |
| 5* | 50* | B | 41 | 87 | A | 100/150, 50/100 |
| 2 | 60 | B | 42 | 94 | A | 50/100, 25/50, 100/150, 150/200, 100/150, 50/100, 300/400, 400/500 |
| 2 | 60 | B | 42 | 104 | A | 50/100, 25/50, 100/150, 150/200, 100/150, 50/100, 300/400, 400/500 |
| 2 | 70 | B | 43 | 119 | A | <25, <25, <25 |
| 2 | 70 | B | 43 | 93 | A | <25, <25, <25 |

RESIN
A = 48% pentaerythritol tri and tetraacrylate mixture; 35% diacrylate of bisphenol A; 17% phenoxyethyl acrylate
B = Dipentaerythritol pentaacrylate
Particle reactive surface modif
M = methacrylate
A = acrylate
The "*" indicates that there is 6 wt % of silica sol 1 present in example 41 in addition to the ZrO2 sol.

Table 9 lists the "10 point mean roughness" in nanometers, as measured by atomic force microscopy (AFM), as well as the cheesecloth durability data. Coatings made in accordance with the present invention exhibit a 10 point mean roughness value of at least 30 nanometers, but preferably about 120 nanometers, as examined using Atomic Force Microscopy on a typical 10×10 micrometer area. The examples compare the effects of the two reins systems, the effect of reactive surface modifier (acrylate vs methacrylate), and the effect of zirconia sols of different sizes on surface roughness and durability. The best performing high refractive index samples employed the broad dispersity ZrO2 sols, the acrylate functionality, and preferably the highly multifunctional acrylate resin. In addition, Table 9 establishes the durability and roughness of two the bimodal examples, in which a high % of low dispersity small

10 contains a substrate 12 formed from PET or polycarbonate, or any other material recognized for its utility as a substrate in antireflective films. An adhesive 14 may be provided on both sides of the substrate 12 whereby the substrate 12 is coupled to a display device 16 and also to a juxtaposed layer outwardly oriented from the substrate 12. In accordance with the present invention, a hardcoat layer 18 is coupled to and layered over substrate 12 thereby forming an outwardly oriented layer in physical contact with substrate 12. An optical layer 20 having a relatively high refractive index of at least 1.6, formed as described above, is next coupled to and layered over hardcoat layer 18. If desired, the construct 10 may include other layers typically used in antireflective film such as a relatively lower refractive index layer 22, or an anti-smudge layer (not shown) as known in the art.

The low index layer 22 may be formed as known in the art. U.S. Pat. No. 6,723,423 exemplifies the known understanding of forming a low refractive index layer and is herein incorporated by reference, although not by way of limitation. An exemplary low index layer may be formed from low refractive index fluoropolymer compositions and derived from an interpenetrating polymer network or semi-interpenetrating polymer network which includes a reactive fluoroplastic and/or a fluoroelastomer (i.e. the functional fluoropolymer phase) blended with multi-functional acrylates (i.e. the acrylate phase) such as trimethylolpropane triacrylate (TMPTA) and optionally additional fluorinated mono-functional acrylates or multi-functional fluorinated acrylates which can be coated and cured by ultraviolet light or by thermal means. The presence of an acrylate crosslinker provides a composition with both low refractive index and improved adhesion to high index polymer substrates such as polyethylene terephthalate ("PET") or hard coated PET films. The low index coating mixture preferably describes a reactive high molecular weight fluoropolymer(s) that can participate in the crosslinking reactions between the monomeric multi-functional acrylates. This enhances the crosslinkability of the fluoropolymer phase to the forming polyacrylate phase and produces a co-crosslinked, interpenetrating or semi-interpenetrating polymer network with enhanced interfacial contact between the high index layer and the low index layer and thereby improves durability and low refractive index.

Various optional permanent and removable grade adhesive compositions 14 may be coated on the opposite side of the substrate 12 (i.e. to that of the hardcoat 18) so the article 10 can be easily mounted to a display surface. Typically, the adhesive 14, substrate 12, and hard coating layer 18 are prepackaged as a film 19 having a release layer (not shown) attached to the adhesive 14. The release layer is then removed and the adhesive layer 14 coupled to a housing or other area of the display 16 to form the optical display 16.

Suitable optional adhesive compositions 14 include (e.g. hydrogenated) block copolymers such as those commercially available from Kraton Polymers, Westhollow, Tex. under the trade designation "Kraton G-1657", as well as other (e.g. similar) thermoplastic rubbers. Other exemplary adhesives include acrylic-based, urethane-based, silicone-based and epoxy-based adhesives. Preferred adhesives are of sufficient optical quality and light stability such that the adhesive does not yellow with time or upon weather exposure so as to degrade the viewing quality of the optical display. The adhesive can be applied using a variety of known coating techniques such as transfer coating, knife coating, spin coating, die coating and the like. Exemplary adhesives are described in U.S. Patent Application Publication No. 2003/0012936, herein incorporated by reference. Several of such adhesives are commercially available from 3M Company, St. Paul, Minn. under the trade designations 8141, 8142, and 8161. The substrate layer 12 may consist of any of a wide variety of non-polymeric materials, such as glass, or polymeric materials, such as polyethylene terephthalate (PET), bisphenol A polycarbonate, cellulose triacetate, poly(methyl methacrylate), and biaxially oriented polypropylene which are commonly used in various optical devices.

It is contemplated that the present invention will find primary application in optical coatings and films including antireflective film, for example. However, it is not limited thereto. It will also be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A UV curable optical coating comprising:
a polymerizable mixture comprising monomer, oligomer, and mixtures thereof; and
surface modified inorganic nanoparticles comprising a majority of surface modified zirconia nanoparticles having an average cross-sectional diameter of about 10 to 30 nanometers and 10 wt-% to 33 wt-% of the total nanoparticles of inorganic nanoparticles having an average cross-sectional diameter of about 80 to 150 nanometers, wherein said optical coating has a refractive index of at least 1.6.

2. The coating of claim 1 wherein said inorganic nanoparticles are zirconia nanoparticles that are surface modified with 3:1 acrylate silane:nonionic silane.

3. The coating of claim 1 wherein said polymerizable mixture comprises one or more monomers having substantial acrylate and/or methacrylate functionality.

4. The coating of claim 1 wherein said majority of nanoparticles comprises about 67 to 90 wt % of the total weight of the nanoparticles.

5. The coating of claim 1 wherein said inorganic nanoparticles having an average cross-sectional diameter of about 10 to 30 nanometers comprise zirconia nanoparticles and the nanoparticles having an average cross-sectional diameter of about 80 to 150 nanometers comprise silica and represent about 10 to 33 wt % of the total nanoparticle weight.

6. A display system comprising the cured coating of claim 1.

7. The UV curable optical coating of claim 1 wherein the cured coating exhibits a 10 point mean roughness value of at least 30 nanometers.

8. The UV curable optical coating of claim 1 wherein the surface modified zirconia nanoparticles are acrylate silane surface modified.

9. The UV curable optical coating of claim 8 wherein said polymerizable mixture comprises one or more monomers having substantial acrylate functionality.

10. An antireflective coating comprising the cured coating of claim 1.

11. The coating of claim 1 wherein said inorganic nanoparticles having an average cross-sectional diameter of about 80 to 150 nanometers are selected from the group consisting of zirconia, silica, titanium, antimony, mixed metal oxides, and mixtures thereof.

12. A coated article comprising:
a polymeric substrate;
a hard coat layer coupled to the polymeric substrate;
a high refractive index optical layer coupled to the hard coat layer; and
an optional low refractive index optical layer coupled to the high refractive index optical layer, wherein said high refractive index optical layer comprises a bimodal system of functionalized zirconia nanoparticles comprising a majority of nanoparticles sized to about 10-30 nanometers and a minority of nanoparticles sized to about 80-150 nanoparticles.

13. The coated article of claim 12 wherein said bimodal system further comprises silica nanoparticles.

14. The coated article of claim 12 wherein said majority of nanoparticles consists of zirconia and said minority of nanoparticles consists of zirconia.

15. The coated article of claim 12 wherein said zirconia nanoparticles exhibit a 10 point mean average of at least 30 nanometers.

16. The coated article of claim 12 wherein said zirconia nanoparticles generally exist as discrete particles within the polymeric substrate.

17. The coated article of claim 12 wherein the high refractive index optical layer has refractive index of at least 1.6.

18. The coated article of claim 12 wherein the high refractive index optical layer comprises less than 70 weight percent of inorganic nanoparticles.

19. The coated article of claim 12 wherein said high refractive index optical layer exhibits a 10 point mean roughness value of at least 30 nanometers.

20. A display system comprising the coated article of claim 12.

21. An optical article comprising:
a polymeric substrate; and
a hard coat layer fixed to the polymeric substrate, said hard coat layer having a refractive index of at least 1.6;
wherein said hard coat layer comprises a bimodal system of functionalized inorganic nanoparticles comprising surface modified zirconia nanoparticles, wherein a majority of nanoparticles are sized to about 10-30 nanometers and 10 wt-% to 33 wt-% of the total nanoparticles are sized to about 80-150 nanometers.

22. The optical article of claim 21 further comprising a low refractive index optical layer coupled to the hard coat layer.

23. The optical article of claim 21 wherein said inorganic nanoparticles comprise ground zirconia nanoparticles.

24. The optical article of claim 21 wherein the hard coat layer exhibits a 10 point mean roughness value of at least 30 nanometers.

25. A display system comprising the optical article of claim 21.

26. A composition containing:
a polymerizable mixture comprising monomer, oligomer, and mixtures thereof; and
surface modified inorganic nanoparticles comprising surface modified zirconia nanoparticles defined by a polydispersity ranging from about 0.4 to about 0.8 and a z-average mean of about 20 to 80 dispersed within said mixture.

27. The composition of claim 26 wherein said nanoparticles are defined by a volume mean average of about 10 to 30 nm and an intensity average: volume average ratio of about 1.5:18.

28. The composition of claim 26 wherein said nanoparticles define a bimodal system comprised of functionalized zirconia nanoparticles comprising a majority of nanoparticles sized to about 10-30 nanometers and a minority of nanoparticles sized to about 80-150 nanoparticles.

29. The composition of claim 26 wherein the cured composition exhibits a 10 point mean roughness value of at least 30 nanometers.

30. The composition of claim 26 wherein the surface modified zirconia nanoparticles are acrylate silane surface modified.

31. The composition of claim 30 wherein said polymerizable mixture comprises one or more monomers having substantial acrylate functionality.

32. An optical article comprising:
a polymeric substrate; and
a hard coat layer fixed to the polymeric substrate, said hard coat layer having a refractive index of at least 1.6;
wherein said hard coat layer comprises the cured composition of claim 26.

* * * * *

UNITED STATES PATENT AND TRADEMARK OFFICE
CERTIFICATE OF CORRECTION

PATENT NO. : 7,264,872 B2  
APPLICATION NO. : 11/026702  
DATED : September 4, 2007  
INVENTOR(S) : Christopher B. Walker, Jr.

It is certified that error appears in the above-identified patent and that said Letters Patent is hereby corrected as shown below:

Column 16
Line 34, Delete "90 C." and insert -- 90° C. --, therefor.

Column 17
Line 35, Delete "(methacryloxypropy1)))" and insert -- (methacryloxypropyl) --, therefor.
Line 63, Delete "(ZrO2" and insert -- ZrO2 --, therefor.

Column 18
Line 43, Delete "(10 μg)," and insert -- (101 g), --, therefor.

Column 20
Line 49, Delete "vaues" and insert -- values --, therefor.

Column 21
Line 15, Delete "he" and insert -- The --, therefor.
Line 51, After "1.6189" insert -- . --.

Column 31
Line 62, Delete "573 565" and insert -- 573-565 --, therefor.

Signed and Sealed this

Twentieth Day of November, 2007

JON W. DUDAS
*Director of the United States Patent and Trademark Office*